United States Patent [19]
Solomon et al.

[11] Patent Number: 6,155,510
[45] Date of Patent: Dec. 5, 2000

[54] LIMITED-USE TAPE CASSETTE

[75] Inventors: Merrill Solomon, 10845 Pleasant Hill Dr., Potomac, Md. 20854; Craig S. Potter, Raleigh, N.C.

[73] Assignee: Merrill Solomon, Potomac, Md.

[21] Appl. No.: 09/212,566

[22] Filed: Dec. 16, 1998

[51] Int. Cl.[7] .................................................. G03B 23/02
[52] U.S. Cl. ........................................ 242/343; 360/132
[58] Field of Search ............................... 242/343, 343.1, 242/343.2, 346; 360/132

[56] References Cited

U.S. PATENT DOCUMENTS

| | | |
|---|---|---|
| 3,584,506 | 6/1971 | Smatko . |
| 3,612,774 | 10/1971 | Wiklund . |
| 3,831,881 | 8/1974 | Tucker . |
| 4,274,605 | 6/1981 | Gruber, Jr. . |
| 4,351,497 | 9/1982 | Kiessling et al. . |
| 4,466,584 | 8/1984 | Chevalier et al. . |
| 4,482,104 | 11/1984 | Saito . |
| 4,512,535 | 4/1985 | Dickson et al. . |
| 4,575,778 | 3/1986 | Vogelgesang . |
| 4,604,671 | 8/1986 | Oishi . |
| 4,618,904 | 10/1986 | Manning ................................. 360/132 |
| 4,632,335 | 12/1986 | Dickson et al. . |
| 4,660,115 | 4/1987 | Westfall et al. . |
| 4,660,116 | 4/1987 | Westfall et al. . |
| 4,702,434 | 10/1987 | Brauer . |
| 4,763,218 | 8/1988 | Westfall et al. . |
| 4,801,107 | 1/1989 | Dixon et al. . |
| 4,802,048 | 1/1989 | Perkins et al. . |
| 4,842,217 | 6/1989 | Vinson . |
| 4,847,718 | 7/1989 | Miller et al. . |
| 4,874,143 | 10/1989 | Armstrong et al. . |
| 4,928,905 | 5/1990 | Granzotto et al. . |
| 4,942,492 | 7/1990 | Che . |
| 5,034,841 | 7/1991 | French . |
| 5,130,879 | 7/1992 | Weiley . |
| 5,152,621 | 10/1992 | Tsuji . |
| 5,228,637 | 7/1993 | Granzotto . |
| 5,402,955 | 4/1995 | Takahashi et al. ............... 242/343.2 X |
| 5,454,528 | 10/1995 | Shanahan . |
| 5,473,688 | 12/1995 | Wiedemer . |

*Primary Examiner*—Donald P. Walsh
*Assistant Examiner*—William A. Rivera
*Attorney, Agent, or Firm*—Nixon & Vanderhye P.C.

[57] ABSTRACT

A limited-use tape cassette includes a follower arm pivotally secured to the housing at one end while abutting the spooled tape of a cassette reel at a distal end. A use-limiting mechanism is provided by the follower arm or another inter-related arm to control rewinding and/or playback of the tape based on follower arm position and/or positional history. In one embodiment, a second rotatable arm is located in controlled interference with the follower arm so as to cause it to "lock up" after a predetermined number of unfettered play back/rewind cycles have taken place. In other embodiments, the arrangement utilizes existing brake teeth of a tape cassette reel to prevent rewinding after a predetermined amount of the video has been viewed. In other arrangements, an over-center follower arm position is utilized together with a stop abutment to bind the tape against complete rewinding only after the video has been substantially completely once viewed. In other embodiments, a pair of arms are pivotally secured to the housing at one end while one or both abut the spooled tape of the take-up reel at a distal end. One of the follower arms interferes with the other during a first period of play. Thereafter, the second arm is released to follow the spooled take-up tape and/or the second arm includes a use-limiting mechanism which is released to control rewinding of the tape based on the position of one of the arms. Other exemplary embodiments are also described.

71 Claims, 31 Drawing Sheets

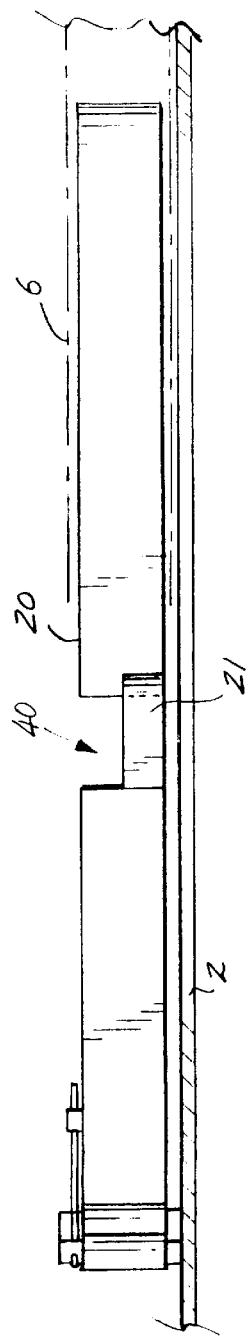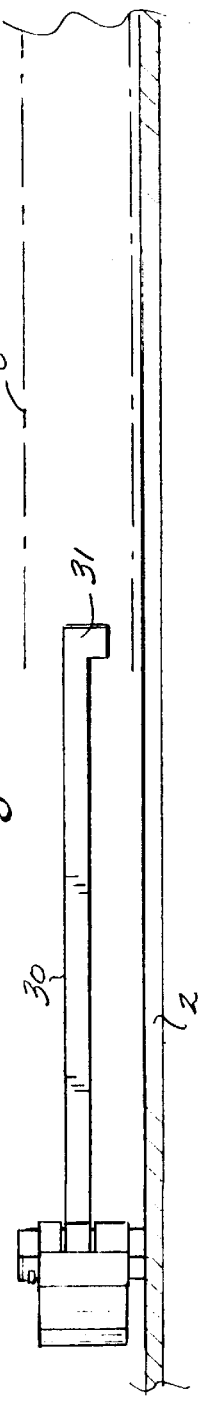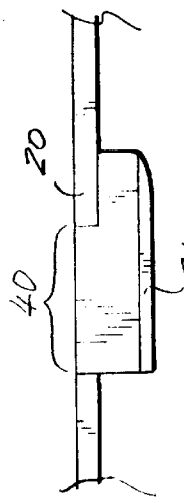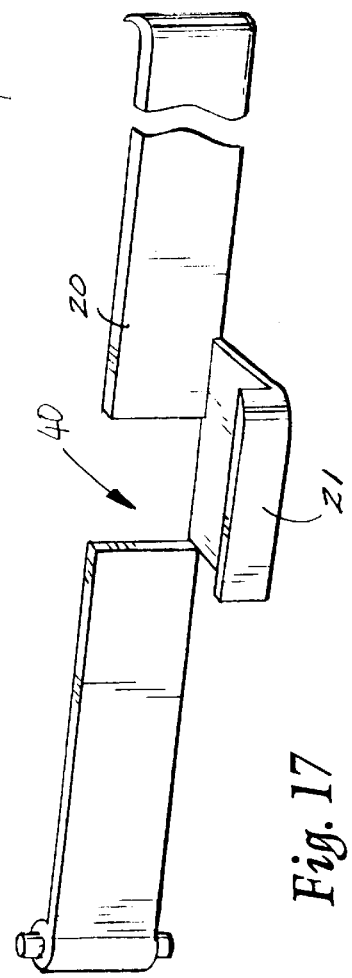

LIMITED-USE TAPE CASSETTE

BACKGROUND OF THE INVENTION

1. Field of the Invention

The present invention relates to a limited-use tape cassette, such as a video tape cassette that only permits a predetermined number of viewings of a video movie. The preferred exemplary embodiment enables at least one complete play of the tape while allowing partial rewinds and at least one full rewind so as to insure at least a predetermined limited number (e.g., one) of substantially unfettered complete use(s) of the cassette.

2. Related Art

Video rental stores typically rent video cassettes for a fixed fee that enables the renter to view the video an unlimited number of times over a prescribed time period. Renters typically are required to pay additional daily rental fees if the video is kept beyond the prescribed initial time period. To accommodate this arrangement, video rental stores must keep detailed renter, accounting and inventory records—as well as check returned cassettes and return them to the rental inventory. The renter, on the other hand must view the rented video soon after acquiring it and then make a prompt return trip to the rental store (to minimize rental fees).

It would be desirable to simply sell "throw-away" or non-returnable video cassettes on a pay-per-view or limited-use basis. If this could be done, it would no longer be necessary for the video store to check and re-stock inventory returns or to administer complicated renter accounts and/or return/restocking costs. In addition, the transaction can now be a sale rather than a rental thus facilitating its occurrence in any store, not just a specialty rental store. The ability to move the transaction from a specialty store to a store the potential customer already visits for other purchases is a significant benefit. Purchasers of limited-use videos would also benefit in that the hassles associated with substantially immediate viewing and/or returning of the rented video cassette could be eliminated. In addition, because of the economics of this limited use approach, the current difficulty of maintaining sufficient rental stock of hit movies to fully satisfy consumer demand is avoided (currently more than 50% of rental consumers cannot find a desired hit movie on a first single trip to the video rental store).

Although there have been many prior attempts to provide such pay-per-view or limited-use tape cassettes, they all have drawbacks that have so far prevented wide-spread usage of such limited-use cassettes. For example, some utilize complicated mechanisms that may be too expensive to manufacture and/or that may be prone to failure or exhibit another annoying adverse impact on a normal unfettered use (e.g., including normal rewind operations to see some portion of the video again which might have been missed during an unexpected phone call or the like) during the authorized number of viewings.

Some prior attempts to provide a limited-use cassette are represented by the following:

U.S. Pat. No. 4,466,584—Chevalier et al (1984)
U.S. Pat. No. 4,802,048—Perkins (1989)
U.S. Pat. No. 5,228,637—Granzotto (1993)
U.S. Pat. No. 5,473,688—Wiedemer (1995)

Chevalier and Perkins add a complicated ratchet-wheel counter arrangement driven by an inter-spool double follower (e.g., a V-shaped inter-reel follower) and which, after a predetermined number of full (or partial) play cycles, locks the cassette from all further use. In Perkins, this locking occurs if the cartridge is thereafter removed from the tape deck and/or it moves an erase magnet into position to erase the tape as it is being thereafter played or rewound.

Granzotto discloses a tape cassette that allows complete play only once. A follower arm follows the wound tape radius on the take-up reel. When a predetermined amount of tape is wound onto the take-up reel, a separate internal lock mechanism is set such that when the tape is thereafter rewound, a free locking arm is displaced into the path of a tooth carried by an inner locking member on the take-up reel (e.g., when a predetermined amount of tape has been rewound onto the supply reel). Thereafter, forward feeding of the tape is inhibited because the locking member locks the take-up reel by virtue of a pawl.

Wiedemer uses a programmed microprocessor control in conjunction with a machine-readable label on the cassette and a controllable internal cassette lock to limit the number of play cycles to some predetermined amount.

Although these prior art examples demonstrate a long-felt need in the art for a limited-use tape cassette, they all involve relatively complex mechanisms which may be prone to failure (or relatively easy to defeat by the consumer) and at least some of which may interfere with an unfettered use of the cartridge during the authorized period of use.

Other prior attempts have employed various types of one-way mechanical clutches or other mechanisms so as to prevent rewinding of the cassette. This, however, seriously interferes with a normal licensed usage of a video cassette service as some stopping, rewinding and re-viewing is within the expected realm of usage by a substantial number of customers. Some examples of these anti-reverse approaches are noted below:

U.S. Pat. No. 3,584,506—Edwards et al (1971)
U.S. Pat. No. 3,831,881—Tucker (1974)
U.S. Pat. No. 4,351,497—Kieseling et al (1982)
U.S. Pat. No. 4,482,104—Saito (1984)
U.S. Pat. No. 4,512,535—Dickson et al (1985)
U.S. Pat. No. 4,632,335—Dickson et al (1986)
U.S. Pat. No. 4,702,434—Brauer (1987)
U.S. Pat. No. 4,801,107—Dixon et al (1989)
U.S. Pat. No. 4,874,143—Armstrong et al (1989)
U.S. Pat. No. 4,928,905—Granzotto et al (1990)
U.S. Pat. No. 5,152,621—Tsuji (1992)

Of course, there are also prior art cartridge locking systems which automatically prevent rotation whenever the cartridge is removed from the video player after a play cycle is begun. U.S. Pat. No. 4,604,671—Oishi (1986) is one example of such a mechanism.

A variation on the anti-reverse approach is disclosed in U.S. Pat. No. 5,454,528—Shanahan (1995) where the anti-reverse mechanism is only invoked if the rotational speed exceeds normal play speed during the first portion of the video—thus preventing the renter from fast-forwarding through preliminary advertisement materials.

A number of prior approaches merely incorporate use counters of various types:

U.S. Pat. No. 4,274,605—Gruber, Jr. (1981)
U.S. Pat. No. 4,575,778—Vogelgesang (1986)
U.S. Pat. No. 5,034,841—French (1991)
U.S. Pat. No. 5,130,879—Weiley (1992)

Various other types of cartridge tape-erasing magnets have been employed (some being deployed so as to insure only one play cycle). For example:

U.S. Pat. No. 3,612,774—Wiklund (1971)
U.S. Pat. No. 4,660,115—Westfall et al (1987)
U.S. Pat. No. 4,660,116—Westfall et al (1987)
U.S. Pat. No. 4,763,218—Westfall et al (1988)
U.S. Pat. No. 4,847,718—Miller et al (1989)
U.S. Pat. No. 4,942,492—Che (1990)

Finally, some prior attempts have even gone so far as to physically destroy the tape just after it is first played—on its way to the take-up reel. On example of this approach is:

U.S. Pat. No. 4,842,217—Vinson (1989)

Accordingly, there remains a need for an improved solution to this long-standing problem.

SUMMARY OF THE INVENTION

This invention provides a greatly simplified limited-use tape cassette. The exemplary embodiments provide substantially unfettered use of the cartridge for at least a predetermined number of uses (e.g., one)—possibly including the ability to rewind and review substantially the entire tape at least once.

Some embodiments of the invention use a simple pivoted follower biased to ride on the take-up reel tape. It and/or another interlocking pivoted arm is (are) configured to limit use of the cartridge after permitting the desired usage.

For example, in some exemplary embodiments, a first longer follower arm restrains a second shorter spring-biased arm during an initial period of tape play. Thereafter, during any subsequent substantial tape rewind operation, the second shorter arm is released (e.g., by sliding out of interference within a recess and cooperating platform of the first follower arm or by a pin follower on the first arm passing out of a multi-path track). The second shorter arm is then biased to engage one of the spools. The second shorter arm is configured so as to thereafter prevent further rewind operations during a final period of tape play.

In other embodiments, a pivoted follower arm passes "over center" (e.g., of a center line passing through the pivot point of the arm and the fixed end of a bias spring) against a stop which then increases spool torque sufficiently to limit further use. A larger follower arm also can act here as a counter to release a second arm for restricting further rewind and/or playback after a predetermined number of play/rewind cycles.

In some exemplary embodiments, a second arm is configured so as to move, at the appropriate time, an integral (or separate) ratchet pawl in tandem with it towards engagement with peripheral ratchet teeth on the take-up reel. At some predetermined point in a playback cycle, further tape play and associated rotation of the second arm spring biases the ratchet arm into engagement with the peripheral teeth of the take-up reel thus preventing reverse rewind motion of the take-up reel during this final period of tape play.

In all embodiments using the supply reel, continued rewind motion is still permitted so as to permit tape disposed inside the tape player to be extracted during cassette ejection in the normal manner.

Some embodiments dimension the length of a follower arm so that it passes "over-center" at some predetermined point (e.g., when beginning to play the last 30 minutes) to engage a stop abutment which prevents further rotation of the pivoted follower arm. Thus, when rewinding (or playing) from that point beyond a predetermined limit is attempted, the increasing radius of the spooled tape on the supply (or take-up) reel binds against the stopped over-center roller-follower arm thus increasing rewind torque until the tape deck automatically stops rewinding (i.e., as if the rewinding operation is complete—even though it is not).

A further exemplary embodiment also uses this "over-center" arrangement by causing the stop-abutment to be defined by predetermined portions of a fixed track in which a spring-biased pin (also moving with a follower arm) is trapped. In this way, the first time the tape is played through some predetermined point (e.g., the start of the last 30 minutes), the stop-abutment is not located "over-center" so that one complete rewind (even from the end of the tape) is permitted. However, on the next play cycle, the spring-biased pin will be forced to move onto a new portion of the track that does permit the arm to move "over-center" at some predetermined point and thus limit the rewind capability of the cassette during a second (final) play cycle. The spring-biased pin moves with a slidable carriage on the follower arm toward its proximal end while also being trapped in the predefined track which, in effect, acts as a mechanical memory to automatically move the stop-abutment to an "over-center" location during a second play cycle.

Such tracks could be defined so as to permit more than 1 (e.g., N) completely unfettered play cycles before the next (e.g., N+1) cycle is restricted to limit further use. This permits some extra usage in order to provide substantially unfettered use during the entire licensed period (e.g., a single use). For example, the presently preferred exemplary embodiment includes an extra track (not shown) to permit original record and rewind cycles to be performed during manufacture—while also automatically leaving the cassette ready to permit the desired number of subsequent playback and rewind cycles.

Another version of an over-center embodiment uses a second short over-center spring biased "stop arm" to define a first follower arm stop during the first play cycle that is not over-center. Then, a catch on the follower arm pulls the stop arm itself over center (with respect to its pivot axis) during the first rewind cycle after a first predetermined amount of play. This moves the stop arm out of the way so as to expose a fixed over center stop for the follower arm. This exemplary embodiment thus uses two over-center pivot arms—but is perhaps easiest to reset, if desired, for another limited use sale.

In another exemplary embodiment, a spring loaded movable carriage is mounted on the follower arm and spring loaded so as to move radially away from the tape (toward the pivot point of the follower arm). The movable carriage is constrained with projections both above and below that are trapped in a predetermined track defined in the cassette housing. In effect, the track defines abutment stops for the follower arm as a function of the tape play history due to the unique Z-shaped configuration of the track.

During the first time the tape is being played, the track defines a first abutment that is prior to an "over-center" position (i.e., not yet "over-center"). Accordingly, during the entire first play, the user has complete normal freedom to use the cassette in any manner whatsoever desired. However, the track is configured such that once the tape passes a particular point (e.g., 30 minutes from the end of the movie), the spring loaded carriage moves along the track in a unidirectional way to effectively "remember" that the tape has now passed this point in the first play of the tape. Thereafter, if the tape is rewound, then the carriage projections follow a second track path that ultimately (during the next play cycle) leads to a second abutment stop that is "over-center", thus leading to eventual disablement for all except the last predetermined period of the movie. Thus, the third embodiment permits the user to have essentially two complete viewings of the video, with absolutely no inhibition at all from normal practice during the entire first single viewing, but with some limited constrainment during the second viewing, ultimately ending in an inability to view any more than the last 30 minutes or so of the tape. As mentioned above, initial record/rewind operations during manufacture may be accommodated where an extra initial part of the track permits such to occur.

A still further exemplary embodiment uses a second over-center stop arm to define a first follower arm stop located prior to an over-center position and a second follower arm stop located after an over-center position. Here, the end of the stop arm in a first position may define the first follower arm stop. Then, as the follower arm moves reversely during a rewind operation after some point in play, it flips the stop arm over-center to expose the second follower arm stop that is over-center and which operates as described above.

Yet other exemplary embodiments use three pivoted arms or a spring biased ratchet wheel and escapement mechanism to effectively count the number of operational record (or play) and rewind cycles permitted before further cassette use is prohibited.

A possible commercial embodiment uses a curved external surface of an expanded tape following arm to maximize arm strength while, at the same time, minimizing arm movement while also simultaneously preventing the tape following contact points of the arm from moving to positions above a line connecting the central axes of the take-up and supply reels (to prevent or at least minimize the possibility that the following arm might be caught by contact with rotating spooled tape and "pulled around" into a premature spool lock-up configuration).

A possible commercial embodiment also provides cycle counting pathways defined by slots formed within the expanded follower arm rather than by walls projecting from the follower arm or some other structure (e.g., the locking arm or cassette casing or the like). This permits a reduced thickness for the moving arm mechanisms. Besides the favorable saving in material and space, this also permits increased mechanism security because simple efforts to defeat movement of the cycle-measuring lock arm would also likely restrain movement of the follower/release arm itself—and thus cause the cartridge to lock up and prevent play even sooner than would have been intended by legitimate use.

A possible commercial embodiment utilizing a locking arm to eventually restrain movement of the tape following arm (rather than a ratchet pawl coming into contact with ratchet teeth on the periphery of the reel) also permits room to accommodate even more additional cycle-measuring tracks and thus permits the cartridge to be designed for permitting additional legitimate play cycles and/or for more manufacturing tolerance.

A possible commercial embodiment may also include a bifurcated release arm structure encasing the cycle-measuring locking arm so that attempts to defeat cycle-measuring movements of the locking arm would also be more likely to simultaneously lock up the follower arm itself and thus even more quickly terminate useful tape play operations and thus defeating such attempts to circumvent the limited play mechanism.

A possible commercial embodiment may also include numerical indicia or the like on the cycle-measuring arm so that the number of remaining legitimate play cycles for the cartridge may be conveniently viewed through an appropriately located transparent aperture in the cassette housing.

BRIEF DESCRIPTION OF THE DRAWINGS

These and other objects and advantages of this invention will become more apparent from the following more detailed description of the exemplary embodiments taken in conjunction with the accompanying drawings, in which:

FIGS. 15–17 are more detailed side elevation, top and side perspective views of the longer follower arm in the second exemplary embodiment;

FIG. 18 is a more detailed side view of the shorter follower arm in the second exemplary embodiment;

DETAILED DESCRIPTION OF EXEMPLARY EMBODIMENTS

Figure 1:
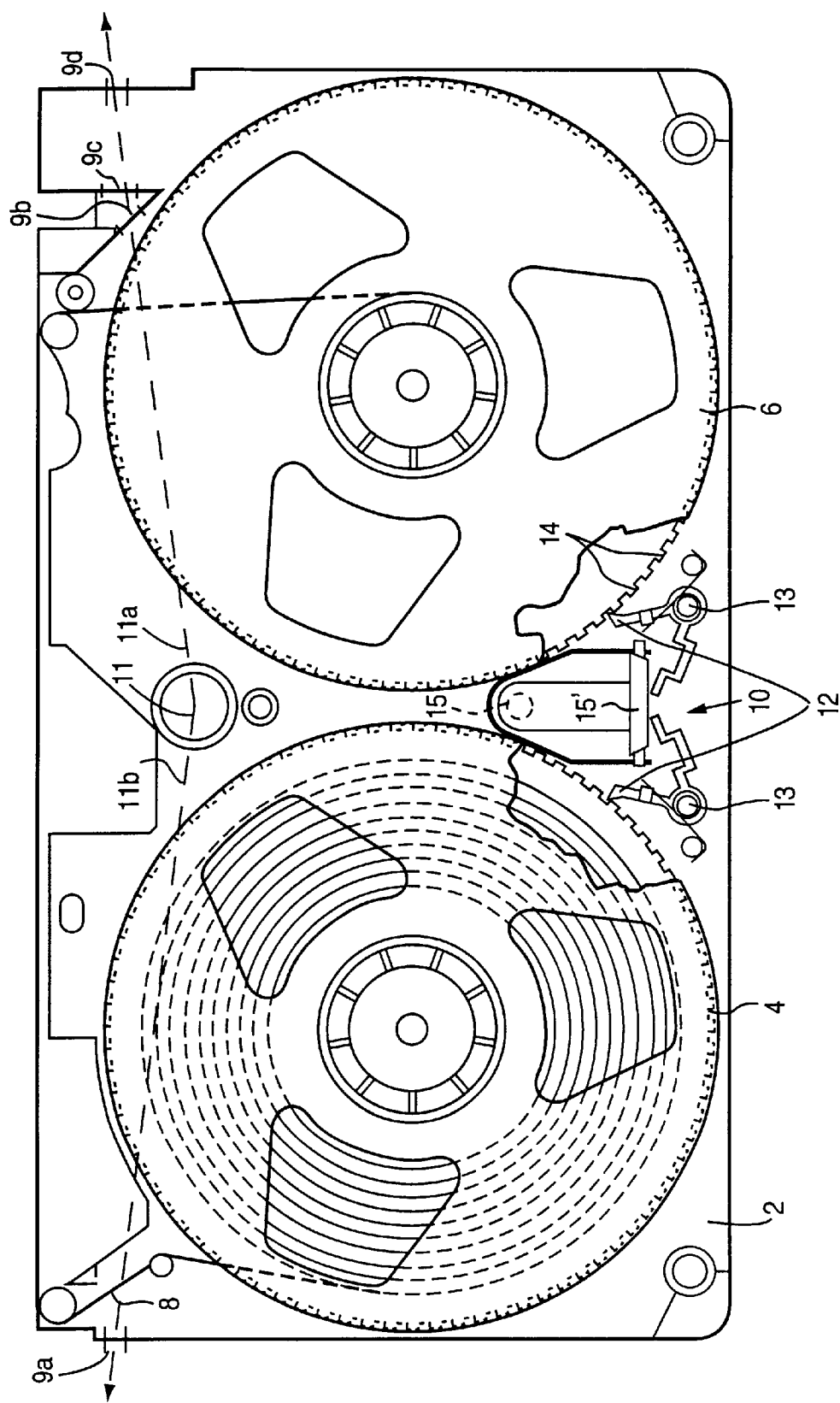
FIG. 1 illustrates a conventional video tape cassette assembly.

FIG. 1 illustrates a conventional video tape cassette including a housing 2 (the lower half of which is depicted in FIG. 1) rotatably supporting supply reel 4 and take-up reel 6. A suitable tape 8 such as a magnetic video tape is conventionally supplied from supply reel 4 through a series of rollers and guides past a reading station and onward to take-up reel 6. A brake assembly 10, which is controlled via an L-shaped rocker 15' pivoted about a lower horizontal axis by pin 15 projecting upwardly into the cartridge from a tape player such as a VCR, includes spring-loaded ratchet pawls which engage teeth on the periphery of reels 4, 6 to prevent tape unwinding movements by either reel 4 or 6 while the cartridge is out of the VCR player. When operatively loaded into the VCR, projecting pin 15 engages and pivots rocker 15' which, in turn, simultaneously pivots these pawl arms to move them out of the way and thus permit the VCR motor drives to rotate reels 4, 6 in either direction. Conventional VCR motor controls can automatically stop further motor drive movement whenever torque beyond a predetermined threshold is experienced—e.g., as when the end of the tape is reached. Light sensitive switches are also used. For example in some machines, a light source projects through aperture 11 and provides light to photo cells through other apertures 9$a$, 9$b$, 9$c$ and 9$d$ along dotted lines 11$a$ and 11$b$. During conventional cassette ejection, the length of tape exposed during play inside the VCR is re-wound onto supply reel 4 before the cassette is ejected and this must, of course, therefore be permitted in all embodiments.

Exemplary structure for effecting limited-use of a tape cassette according to the present invention is readily adaptable to such a conventional tape cassette.

Figure 6:
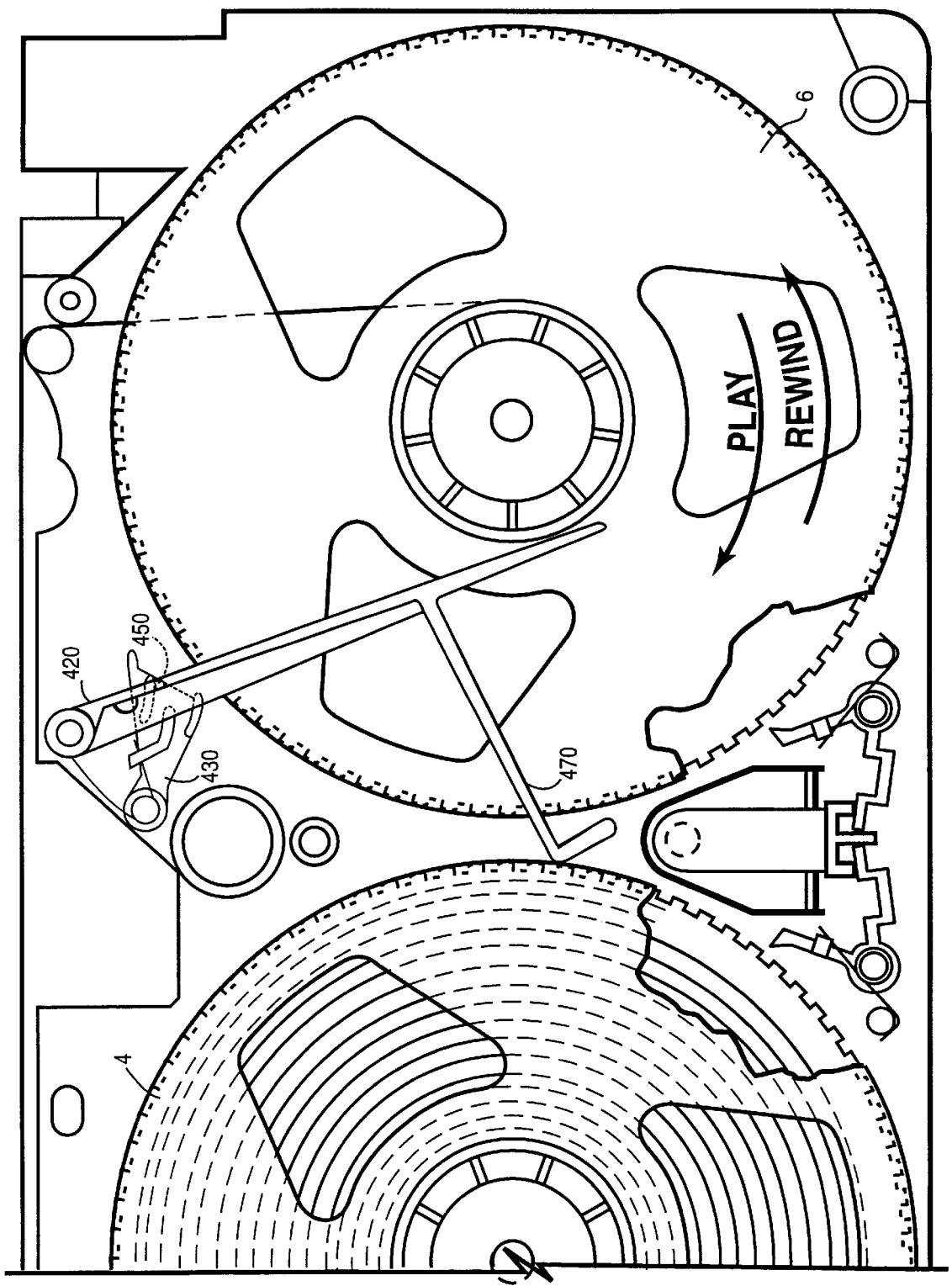
Figure 7:
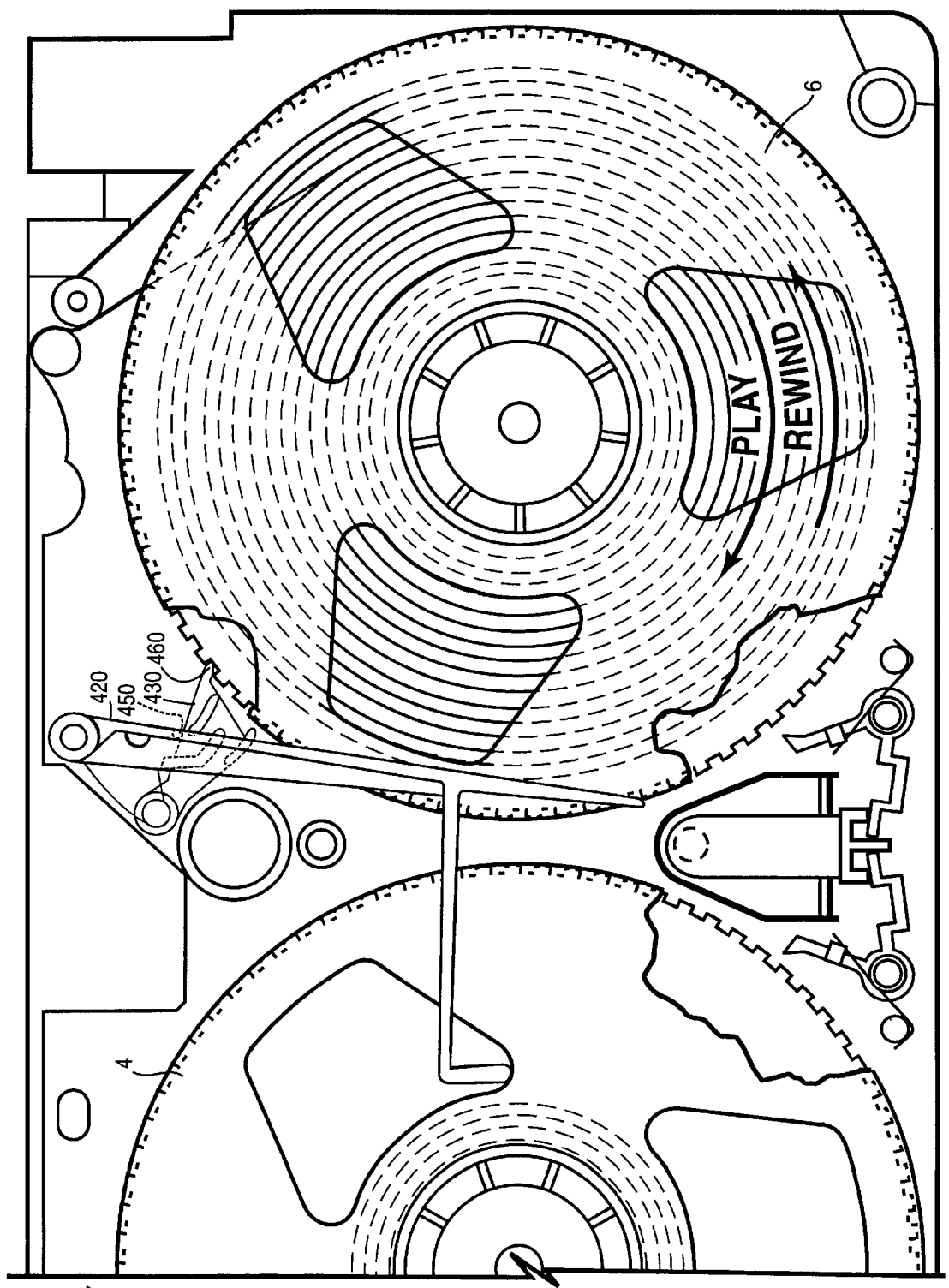
Figure 8:
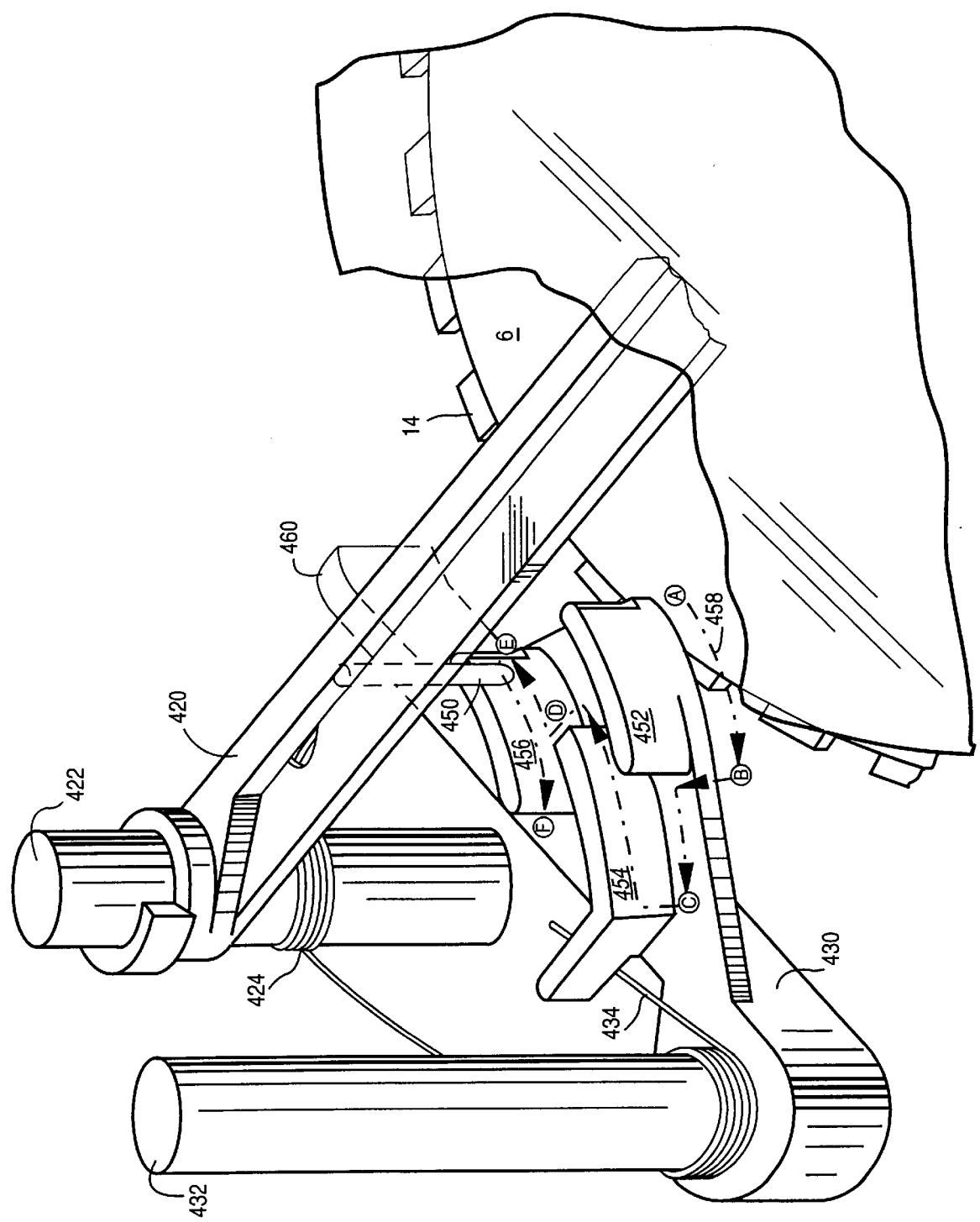
FIG. 8 is a more detailed perspective view of the shorter arm and its relationship with a follower pin on the longer arm of the first embodiment.

FIGS. 2–8 illustrate a first exemplary embodiment according to the present invention. FIGS. 2–7 depict the supply reel 4 and take-up reel 6 in different stages of tape play, rewind and re-play cycles. FIG. 8 is an enlarged perspective view. The first longer arm 420 is pivoted at 422 and spring-biased in a counter-clockwise direction (as depicted in the drawings) with spring 424 so as to cause its smooth distal end surface to abut and follow the radial dimension of tape 8 spooled on the take-up reel 6. The shorter arm 430 is pivoted at 432 and spring-biased by spring 434 to rotate in the opposite or clockwise direction as shown in the drawings.

As shown in the drawings and especially at FIG. 8, the longer arm 420 includes a downwardly projecting follower pin 450 which passes along a track defined by shaped walls 452, 454 and 456 extending upwardly from a platform on the shorter arm 430. The spaced array of these walls thus defines a track 458 (depicted by chain line 458 in FIG. 8) along which the follower pin 450 passes as arm 420 rotates CCW, CW and CCW during the permitted different stages of tape play, rewind and re-play cycles. As depicted in FIG. 8, track 458 proceeds in the directions shown by arrows so as to pass through various stations A–F during these permitted motions. As noted earlier, it is preferable to include yet another set of walls defining initial record/rewind cycles so as to easily permit manufacture processes without the need to thereafter somehow reset the use-limiting mechanism. If an extra set of cycles (i.e., initial record and rewind cycles) is provided by including further track 458 sections, the use-limiting mechanism becomes essentially "transparent" to conventional manufacturing processes.

While on the track 458 and abutting one of the projecting walls 452, 454 or 456, the downwardly projecting follower pin 450 thus restrains the shorter arm 430 from fully pivoting in the clockwise direction. However, when the follower pin 450 eventually does pass the final station F along path 458, shorter arm 430 is then fully released so as to rotate CW and cause an integral ratchet pawl 460 at its distal end to engage ratchet teeth 14 around take-up reel 6. This permits only one way play motion thereafter (i.e., so as to prevent any further rewind—and thus—re-playing of any previous portion—of the tape through the remainder of the last playback cycle). As with other embodiments to be described in more detail below, this final stage of play preferably may occur, for example, around 15 or 30 minutes from the end of a second playback cycle.

Figure 2:
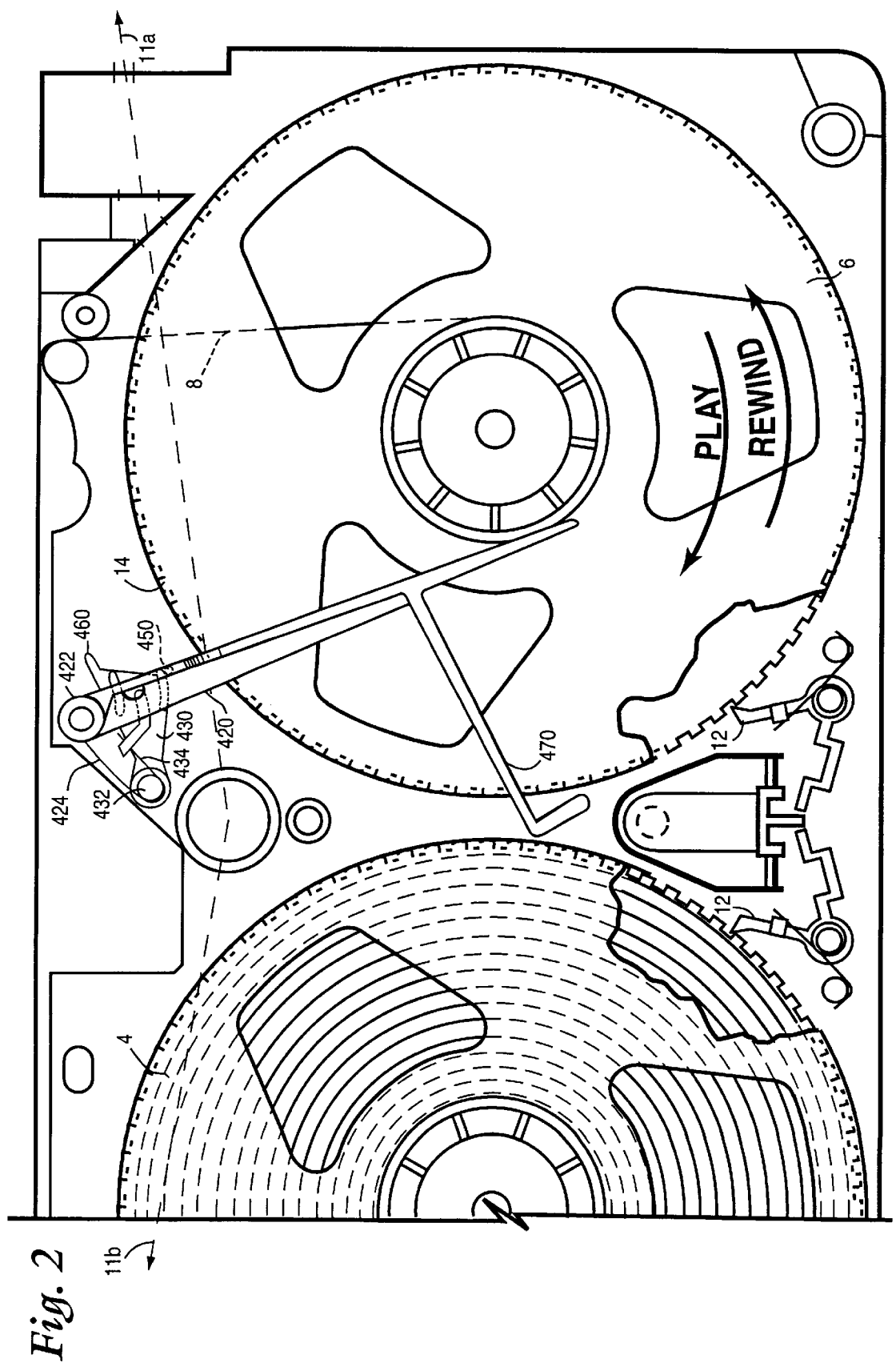
FIGS. 2–7 illustrate the take-up and supply reels of a video tape cassette incorporating structure according to a first exemplary embodiment of the present invention in successive stages of cassette usage.

As may be seen in FIG. 2, arm 420 may include a cut-away window (or other effectively transparent structure) 421, if necessary or desired, to accommodate light path 11$a$.

FIG. 2 depicts the status of the long arm 420 and the short arm 430 at an initial time before the cassette has been inserted into a machine for playback. Accordingly, it will be noted that the ratchet arms 12 are engaged to lock both the supply reel 4 and the take-up reel 6 from unreeling motion. At this initial stage, the follower pin 450 is located at station A along track 458 thus restraining the shorter arm 430 and maintaining its distal ratchet pawl 460 from engagement with the teeth 14 of take-up reel 6.

As depicted in the drawings (e.g., FIG. 4), the longer arm 420 includes a transverse intermediate arm 470 which has a distal end in flexible engagement (or, more preferably, relatively close clearance) with the spooled tape on supply reel 4. This transverse arm provides static stability so that normal shipping and handling movements of the cassette before it is inserted into a playback machine (e.g. in the configuration of FIG. 2) will not cause inadvertent motion of the arm 420 (e.g., due to inertial forces) and thus possibly some premature clockwise rotation of the short arm 430.

As will be appreciated, the end surfaces of arms coming into actual contact with spooled magnetic tape must have smooth rounded ends and/or rotating rollers or the like so as to prevent damage to the tape.

Figure 3:
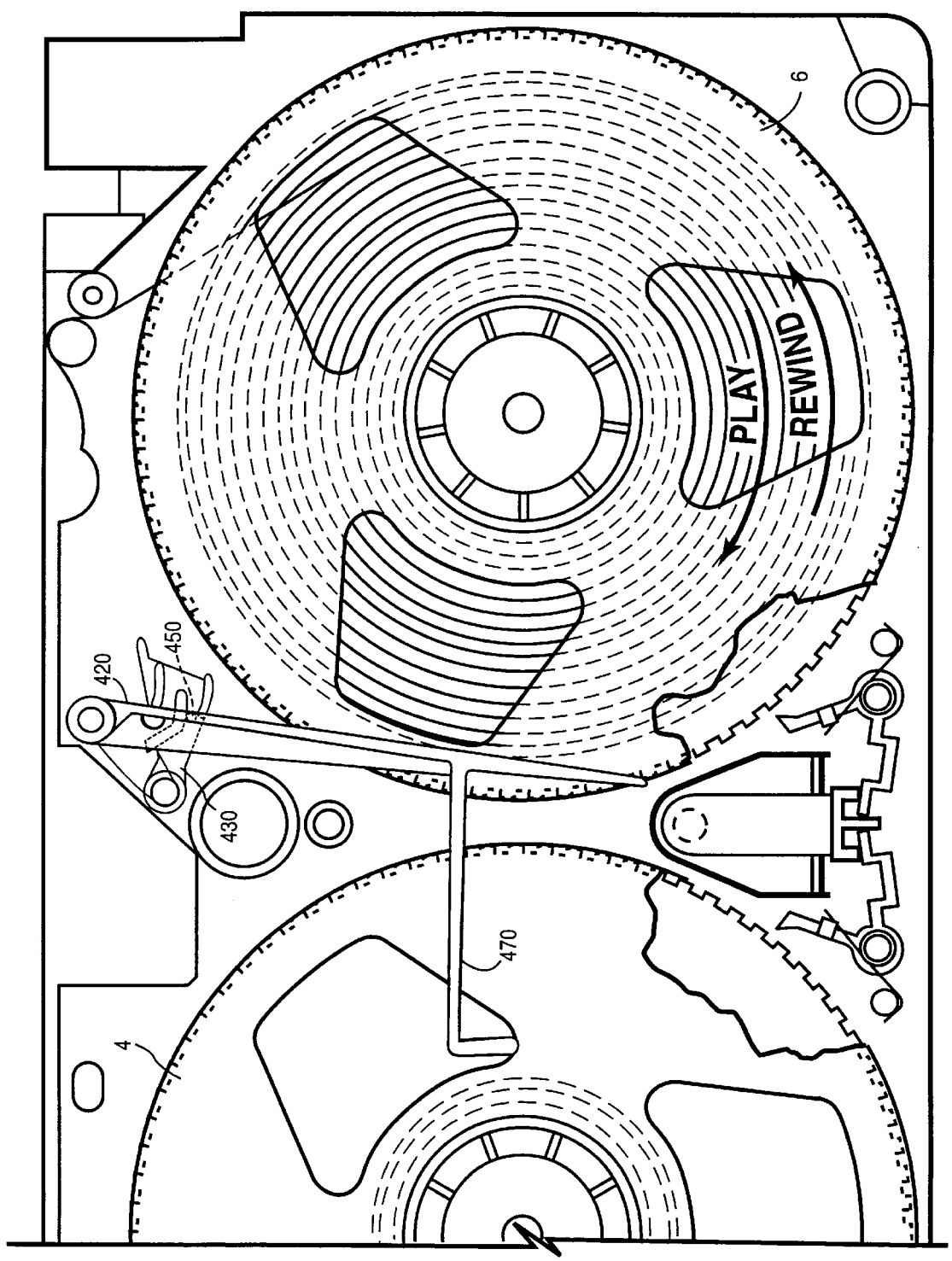

During the first playback cycle, the follower pin 450 will thus pass along track 458 while engaged with wall 452 and thus continue to hold the short arm 430 against further clockwise rotation. At a desired predetermined point in the first playback cycle (e.g., approximately 30 minutes from the end of the first playback cycle as depicted in FIG. 3), the follower pin 450 will find itself at station B whereupon the short arm 430 is enabled to rotate by a first increment in the clockwise direction thus letting the follower pin 450 pass off wall surface 452 and onto wall surface 454 so as to continue along track 458 towards station C. FIG. 3 depicts the situation just after the short arm 430 has undergone this first incremental clockwise rotation and pin 450 is now in contact with surface 454.

Figure 4:
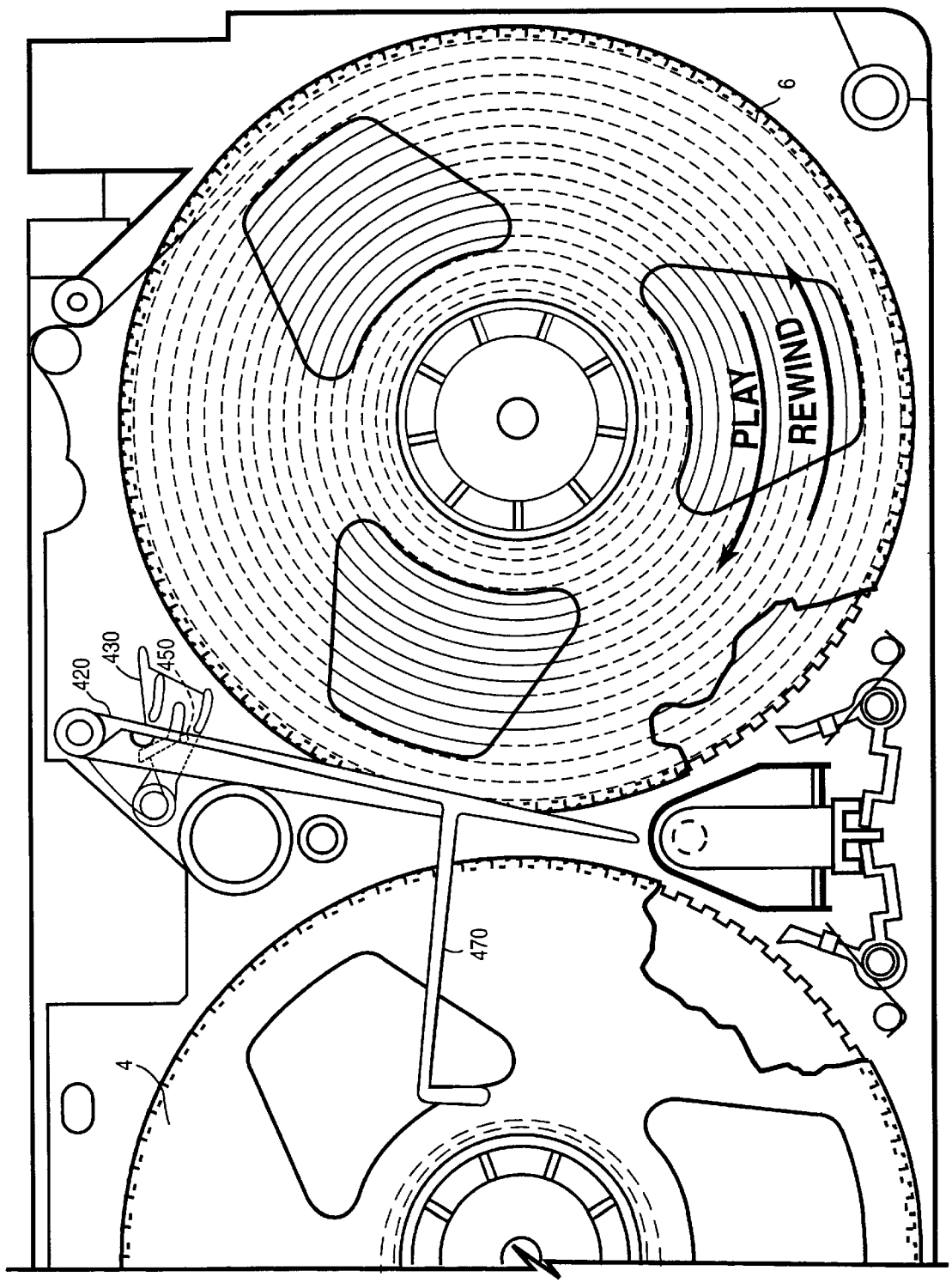
Figure 5:
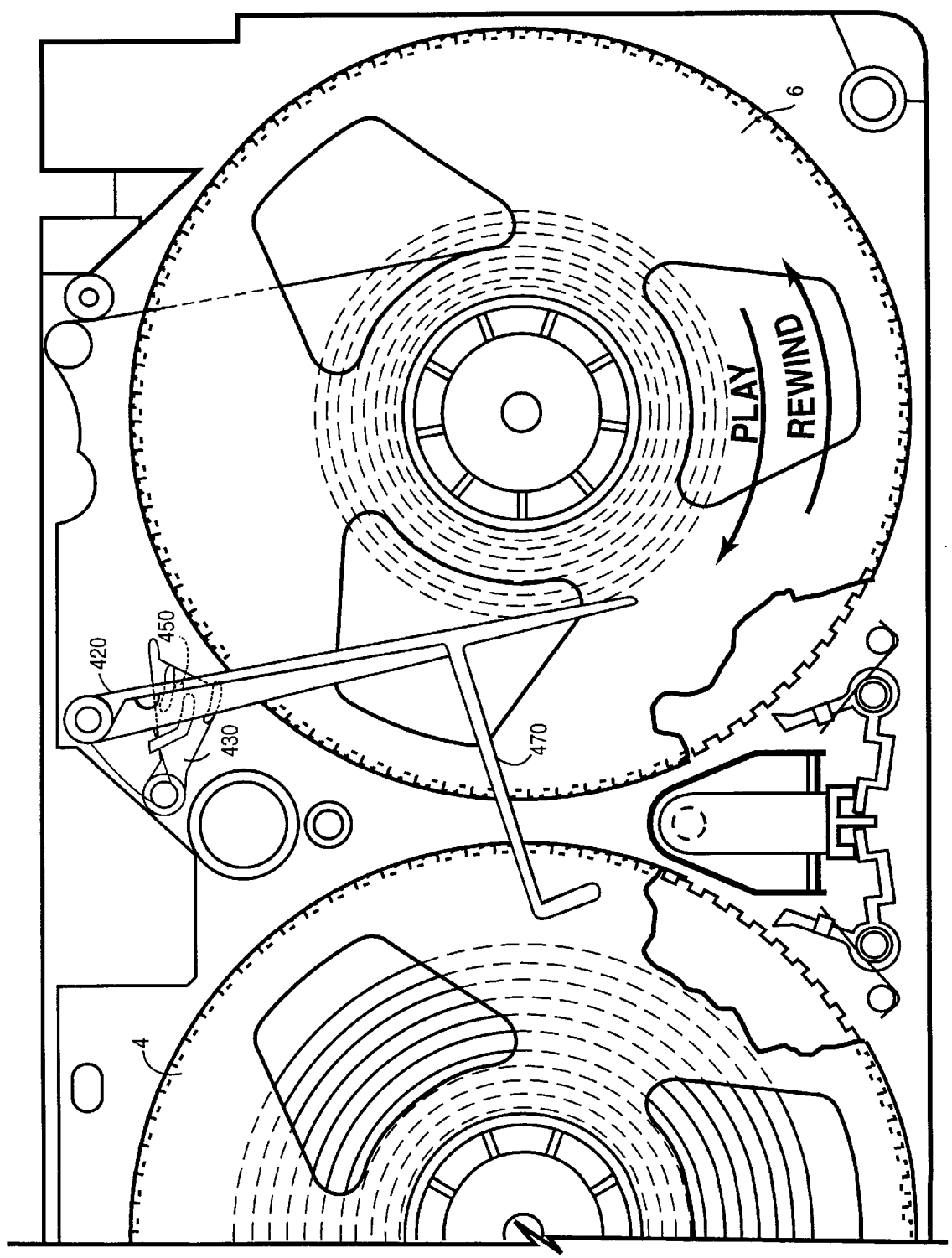

As the first playback cycle continues, pin 450 continues to move on track 458 towards station C. This further stage of the first playback cycle is depicted in FIG. 4. Thereafter, during the first rewind cycle, the longer arm 420 is caused to again rotate in the counter-clockwise direction (because of its spring bias against a shrinking radius of spooled tape) which causes follower pin 450 to move towards station D along track 458. Eventually, during the first rewind cycle, the follower pin 450 will pass station D and thus permit the shorter arm 430 to undergo a further incremental clockwise rotation so as to place the follower pin 450 into contact with wall surface 456. This situation in the first rewind cycle is depicted at FIG. 5. As will be appreciated, as the rewind cycle continues to a new start for the second playback cycle as depicted in FIG. 6, the follower pin 450 will now find itself at station E. As also depicted in FIG. 8, the follower pin 450 will thus continue to restrain short arm 430 and maintain the ratchet pawl 460 away from teeth 14 of take-up reel 6.

During the second playback cycle, the arm 420 is again caused to rotate in the clockwise direction thus moving follower pin 450 along wall surface 456 on track 458 towards station F. When it reaches station F and passes off wall 456, it no longer restrains the short arm 430 from continued clockwise rotation. As will be appreciated, the dimensions of wall surface 456 determine when station F will occur in the second playback cycle. However, as depicted in FIG. 7, in the exemplary embodiment this point in time would preferably come at approximately 15 to 30 minutes before the end of the second playback cycle. Thereafter, as depicted in FIG. 7, the short arm 430 is biased fully clockwise so that its distal ratchet pawl 460 now engages teeth 14 and permits only continued playback operation. As should be appreciated, track 458 is preferably extended by simply adding more walls to the array defining the track (e.g., to accommodate an initial record/rewind process during manufacture).

FIGS. 9–18 illustrate a second exemplary embodiment according to the present invention. FIGS. 9–14 depict the take-up reel 6 in different stages of tape play, rewind, and re-play cycles.

Figure 9:
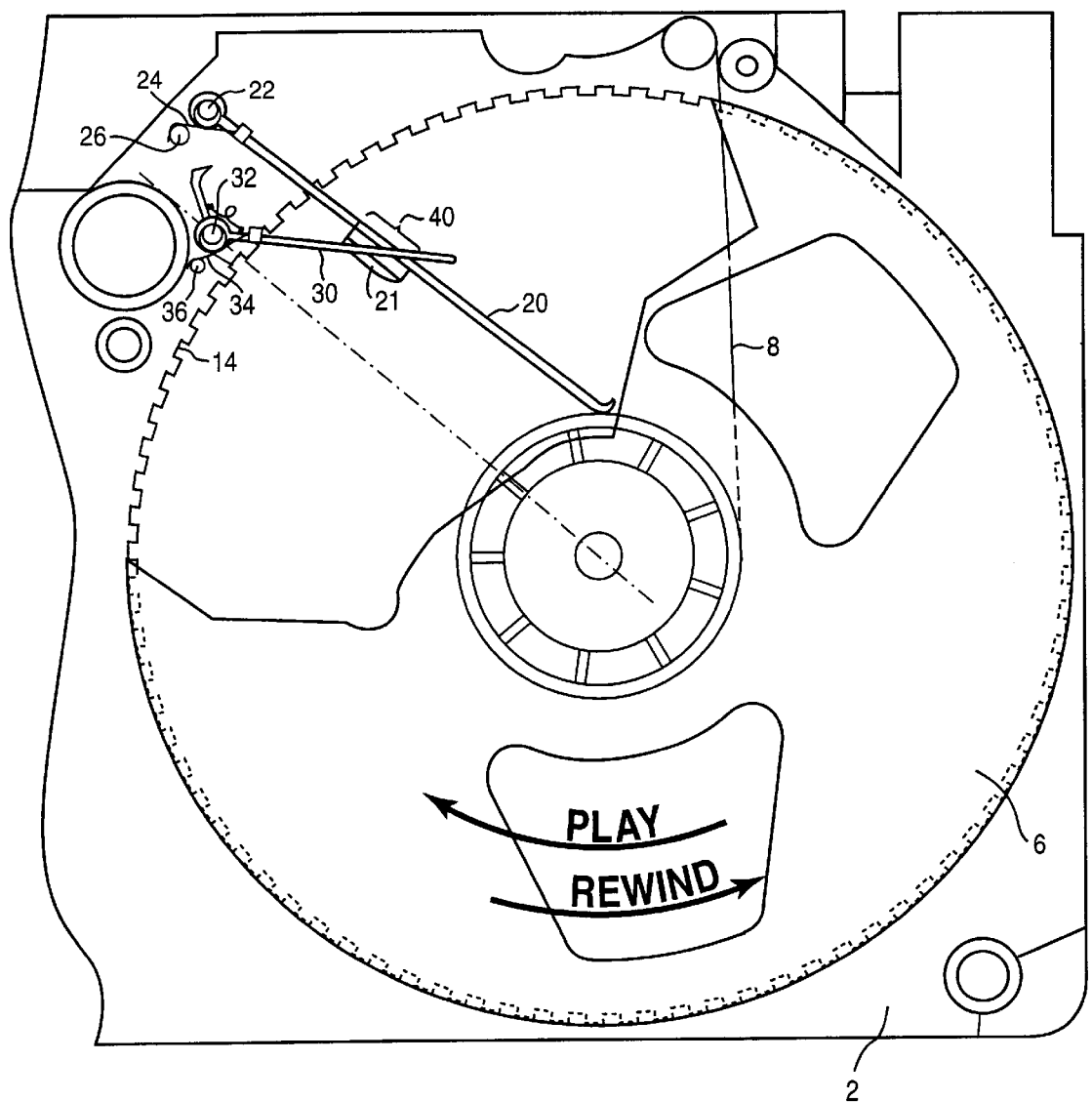
FIGS. 9–14 illustrate the take-up reel of a video tape cassette incorporating structure according to a second exemplary embodiment of the present invention in successive stages of cassette usage.

As can be seen in FIG. 9, a first longer follower arm 20 is pivoted at 22 and spring biased with spring 24 acting against stop 26 so as to cause its curved distal end to abut and follow the radial dimension of tape 8 on the take-up reel 6.

Figure 10:
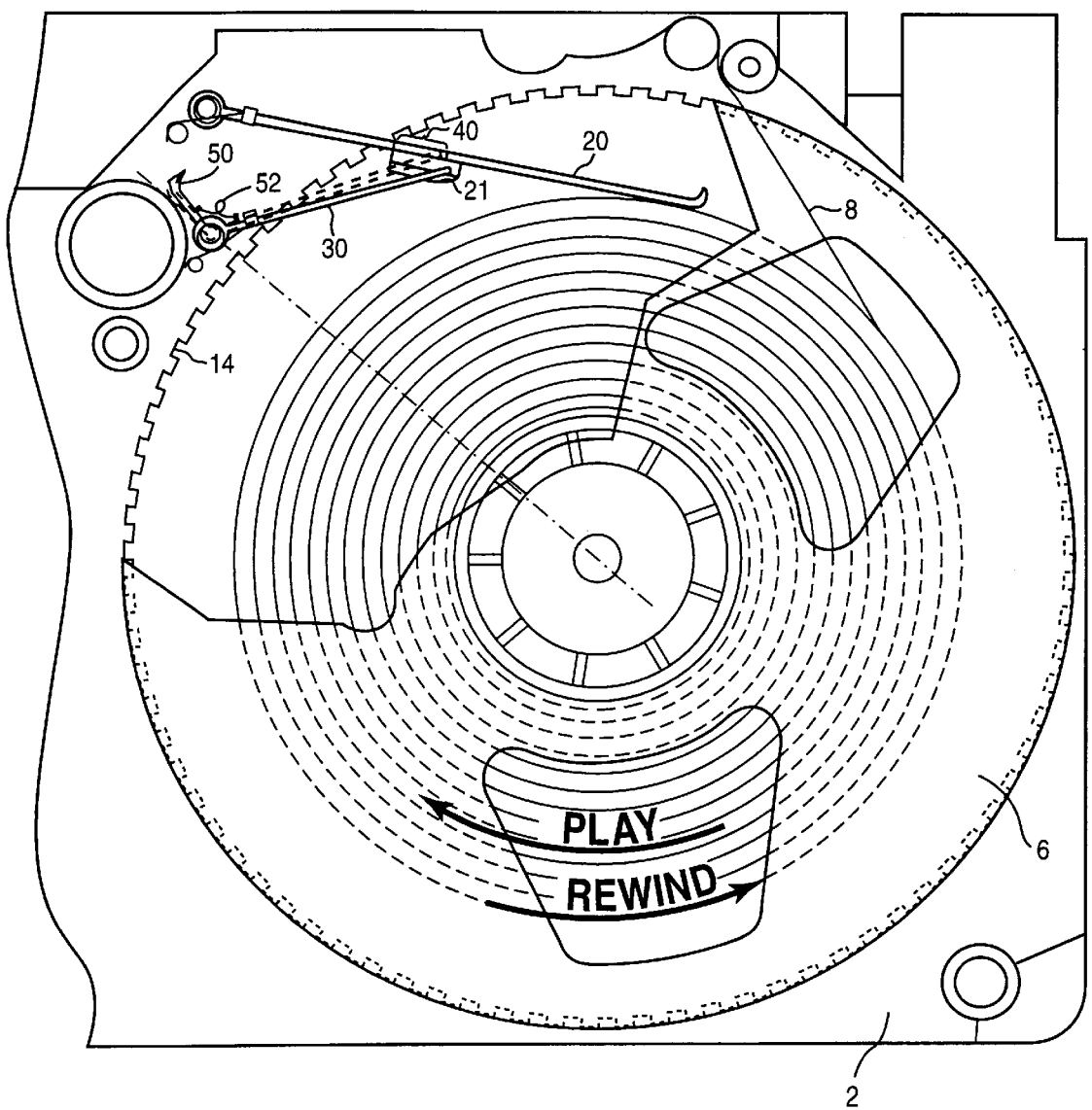

A second shorter follower arm 30 is pivoted at 32 and spring biased by spring 34 acting against stop 36 to also rotate in the clockwise direction. However, in the initial phase of tape play as depicted in FIG. 9, the second follower arm 30 is restrained by sliding within a slot 40 of the first follower arm 20. As will be appreciated and described further below, eventually after an initial period of tape play, the first follower arm 20 will have been rotated counter-clockwise sufficiently to permit the shorter second follower arm 30 to slide out of slot 40 and thereafter (as shown in FIG. 10) be further restrained by a platform 21 carried by arm 20 just below slot 40.

Figure 11:
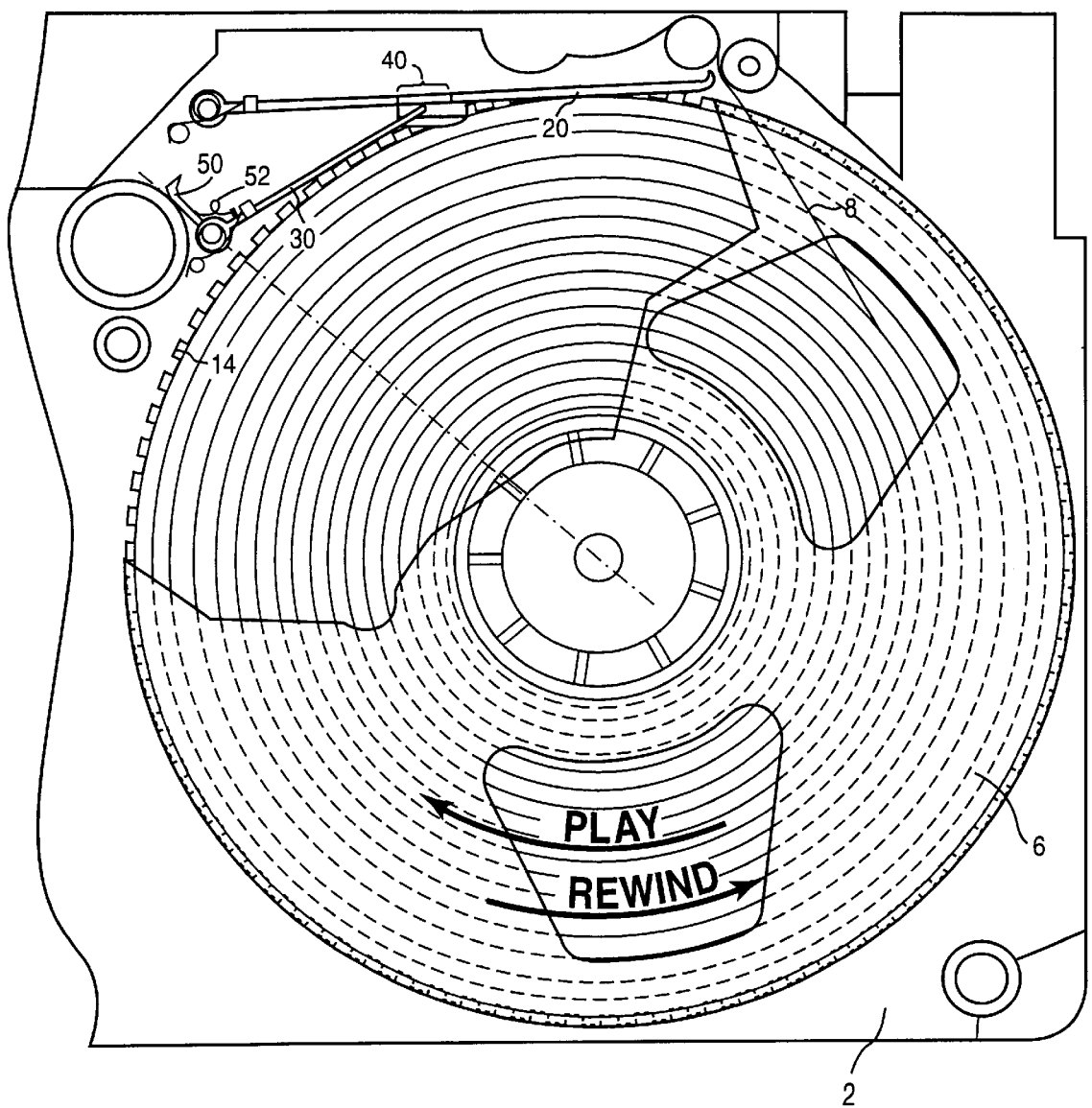
Figure 12:
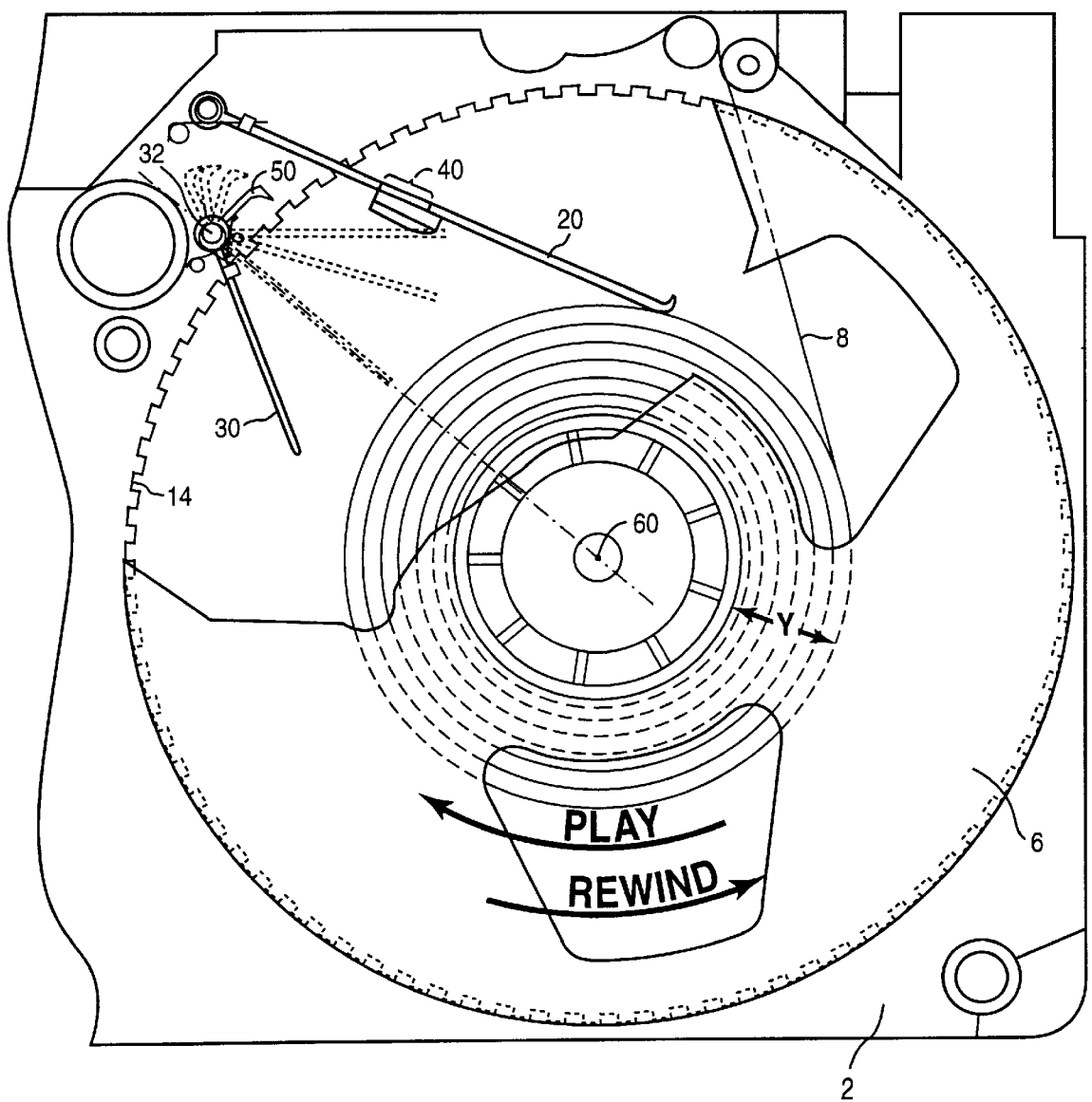

The shorter arm 30 includes a distal transverse leg 31 (as shown in FIG. 18) which slides along platform 21 (and is thus restricted from contact with tape 8) throughout the remainder of the first play cycle (as depicted in FIG. 11) or subsequent plays if additional platforms are added to the longer follower arm 20. In this way, premature contact of the distal end of arm 30 with tape 8 is prevented thus preventing possible jamming or unwanted damage to the tape. However, during a subsequent rewind operation, leg 31 passes over the distal edge of platform 31 so as to now release the shorter arm 30 (as depicted in FIG. 12).

As will be appreciated, the distal end of both follower arm 20 and follower arm 30 should be sufficiently curved so as to minimize friction forces on the spooled tape and to otherwise permit free unfettered movement of the tape reel during normal play and rewind operations. Of course the curved end of the second follower arm must not hang up when it is supposed to be released from slot 40 and/or platform 21 by the first follower arm. A cylindrical outer end shape is preferred since it always provides a tangent contact surface to the circumference of the spooled tape.

Although it has not yet performed any function, it should also be noted that ratchet arm 50 is spring biased (e.g., as depicted at 52) to move in tandem with the second follower arm 30 (e.g., by being pivoted on the same pivot point 32 and biased by spring 52 to abut a pivotal stop with respect to the second follower arm 30 thus maintaining a minimum angular relationship between the ratchet arm 50 and the second follower arm 30). This "initial" period of tape play may, for example, represent all but the last thirty minutes of the playable tape. As will be appreciated, different initial play periods can be achieved by suitably dimensioning slot 40, platform 21 and the length of the second follower arm 30 so as to achieve any desired initial tape period (or number of record/playback-rewind cycles).

During continued tape play without rewind, the leg 31 of the second follower arm 30 is slidingly supported by platform 21 as arm 30 is forced to move further counterclockwise—and there will be absolutely no restriction on the continued play or rewind capability of the cassette. However, after a substantial rewind (e.g., determined by the length of the second follower arm 30, leg 31 and platform 21), as depicted in FIG. 12, the second follower arm 30 will be spring biased to rotate clockwise beyond the center line defined by the chained line shown in FIG. 12 passing between the pivot axis 32 of the second follower arm 30 and the pivot axis 60 of the take-up reel 6. Thus, the second follower arm 30 will pass through successive clockwise positions as shown in dotted lines in FIG. 12 once a sufficient tape rewind has taken place (e.g., leaving less than Y spooled tape on the take-up reel 6). As can now be appreciated, during further play when the distal end of the second follower arm 30 again abuts the spooled tape, it will now be forced to rotate in a clockwise sense—and to move the ratchet arm 50 in tandem therewith towards engagement with the peripheral teeth 14 of the take-up reel 6 (as depicted in FIG. 14).

The dimension Y may also correspond to approximately thirty minutes of tape play (i.e., thirty minutes from the start of a video). Preferably, the bias spring for the second follower arm 30 is dimensioned so that it is in a "neutral" position as shown in FIG. 12 (i.e., and is just past "over center" and is at this point out of contact with any spooled tape due to its shorter dimension). If the tape is stopped during rewind at the exact dimension Y, then the spring bias force on the follower arm 30 should be sufficiently strong to nevertheless flip it "over center" into position for thereafter restricting further use of the cassette as shown in FIG. 12.

Figure 13:
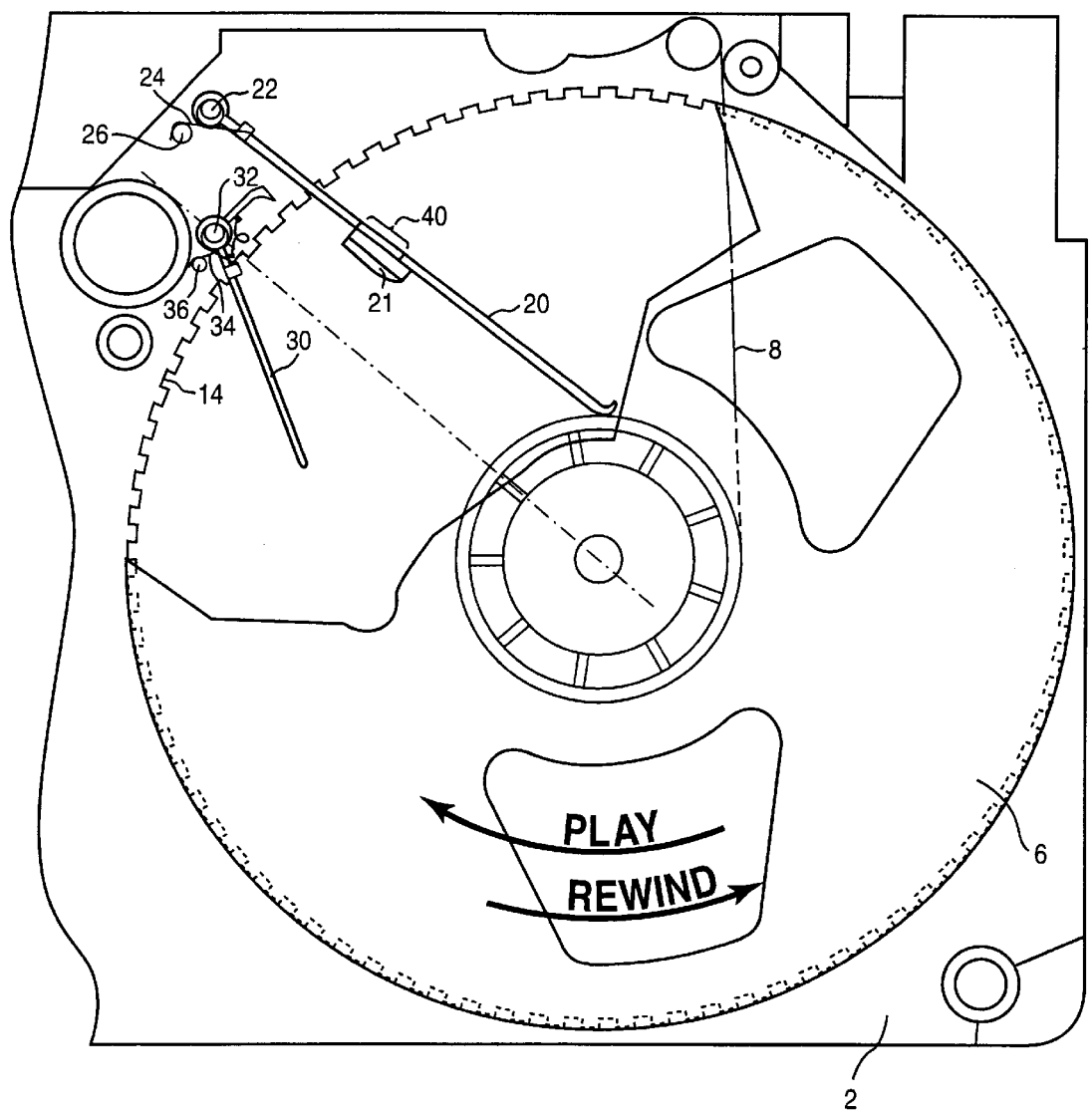

If a complete tape rewind operation is now performed, then the cassette will end up in the configuration depicted at FIG. 13. As will be noted, this is different from FIG. 9 at the start of the first tape play because the second follower arm 30 is no longer restricted or restrained by the first follower arm 20. And, as shown in FIG. 13, the second follower arm is now in its operative "over center" position where it will be forced to rotate in a clockwise sense once it comes into abutment with spooled tape on the take-up reel 6. Thus, at some point during the second play of the tape (or second play after release from the last platform), both follower arms will be riding on the spooled tape—albeit the first follower arm will be caused to rotate in a counterclockwise sense while the second follower arm will be forced to rotate in a clockwise sense. In the preferred exemplary embodiment, the spring bias forces are dimensioned such that both arms 20 and 30 are in an essentially "neutral" biased position in the situation depicted at FIG. 13 (i.e., at the start of the second viewing after release from the platform during a complete rewind operation).

Figure 14:
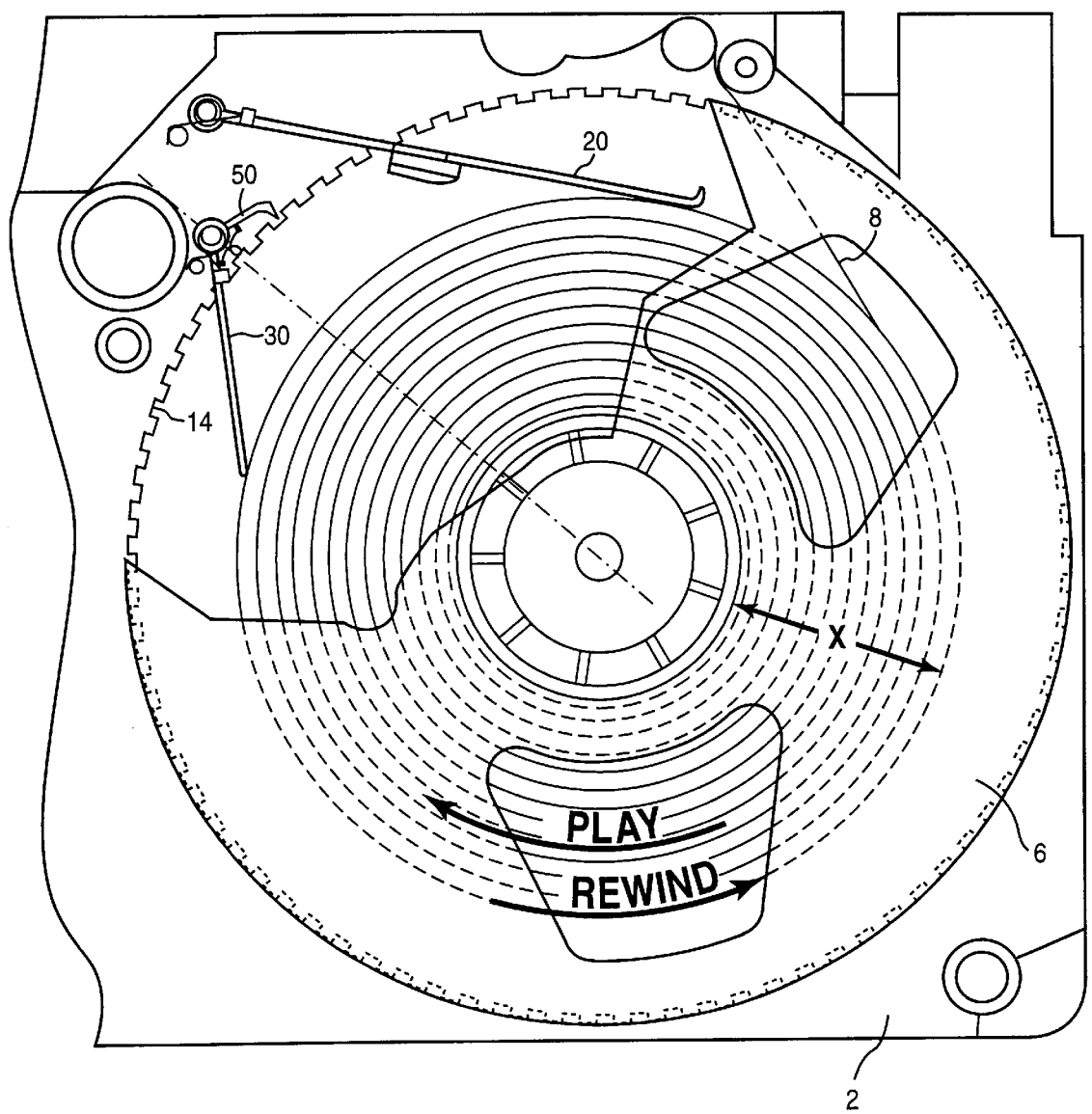

FIG. 14 depicts the state of the cassette during the second play cycle after the initial play period X (e.g., thirty minutes before the end of the video). At this point, the clockwise movement of the second follower arm 30 has brought tandem movements of the ratchet arm 50 in a clockwise sense so that it begins to engage with teeth 14 about the periphery of take-up reel 6. As can be seen, the pawl at the end of ratchet arm 50 is shaped so as to permit continued play but not rewind. Further play will cause further clockwise rotation of the follower arm 30. However, now that ratchet arm 50 is engaged with peripheral teeth 14, the spring biasing ratchet arm 50 against a rotational stop associated with the follower arm 30 simply increasingly biases the ratchet arm into ever more secure engagement with the peripheral teeth 14. Thus further rewind after the second play (of arm release beyond X) is absolutely prevented (albeit some rewind-directed motion of the supply reel 4 is still permitted during conventional cassette ejection).

Figure 19:
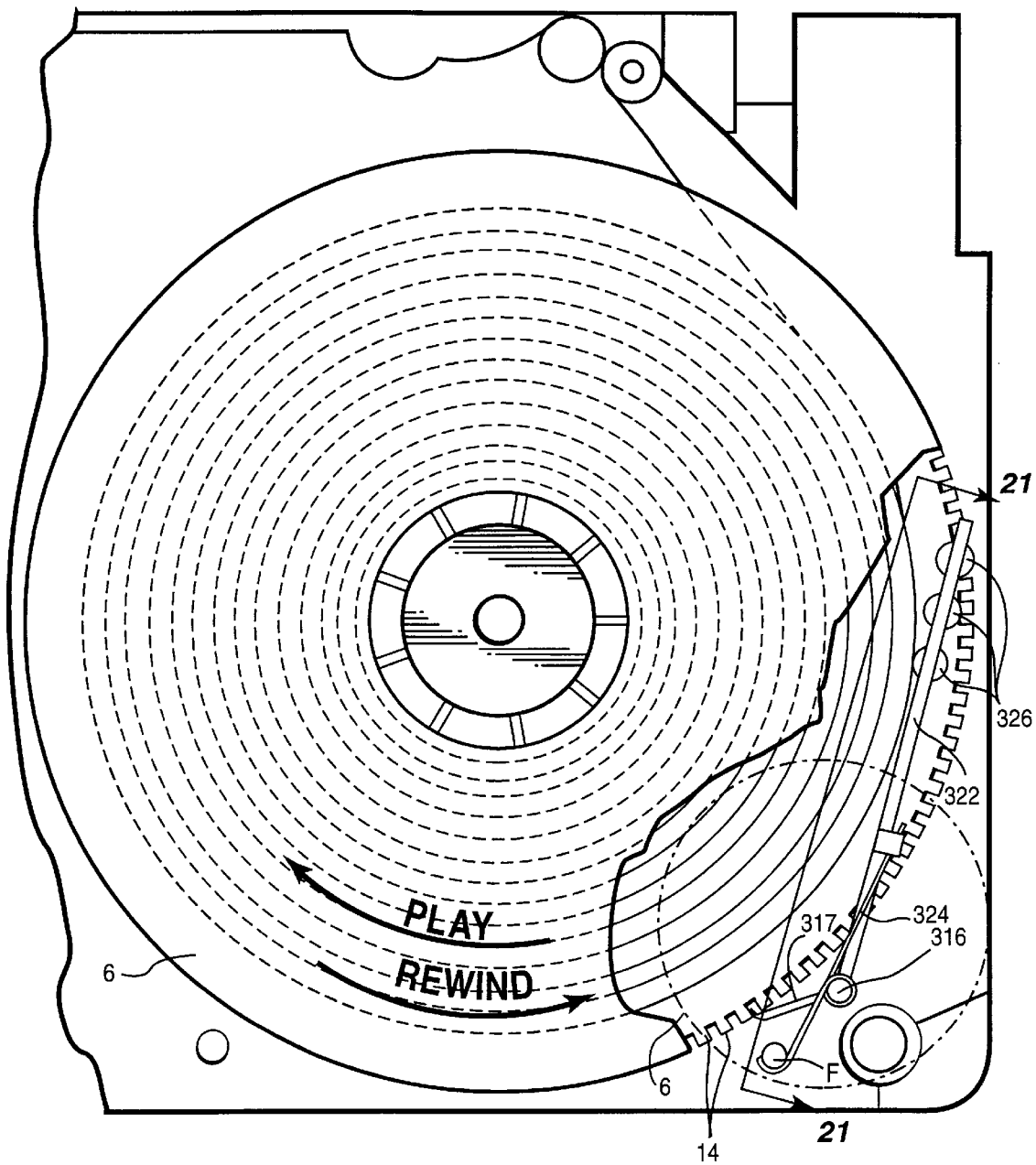
FIG. 19 illustrates one reel of the video tape cassette incorporating structure according to a third exemplary embodiment of the present invention.
Figure 20:
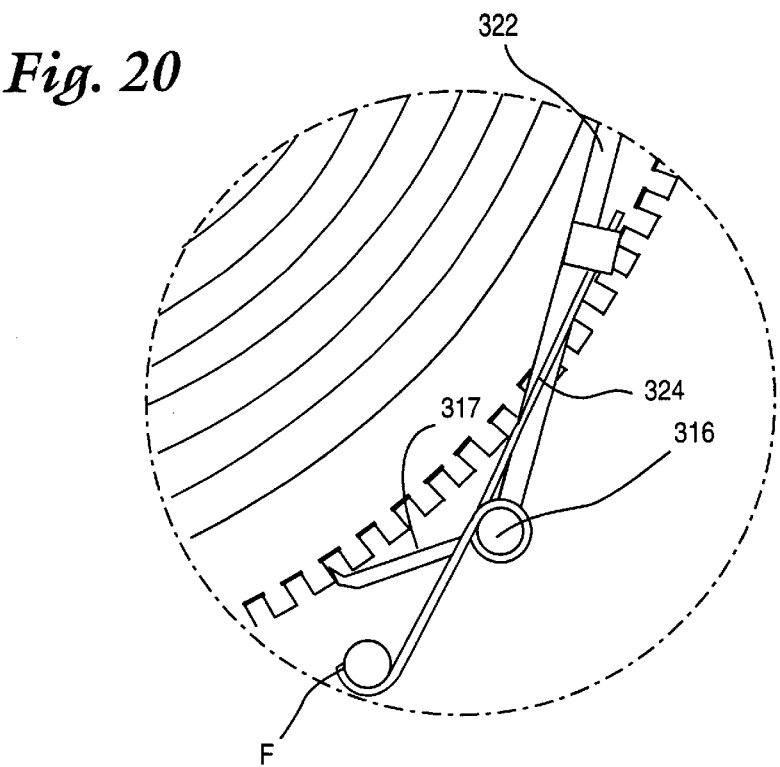
FIG. 20 is a close-up view of the encircled area in FIG. 19.
Figure 21:
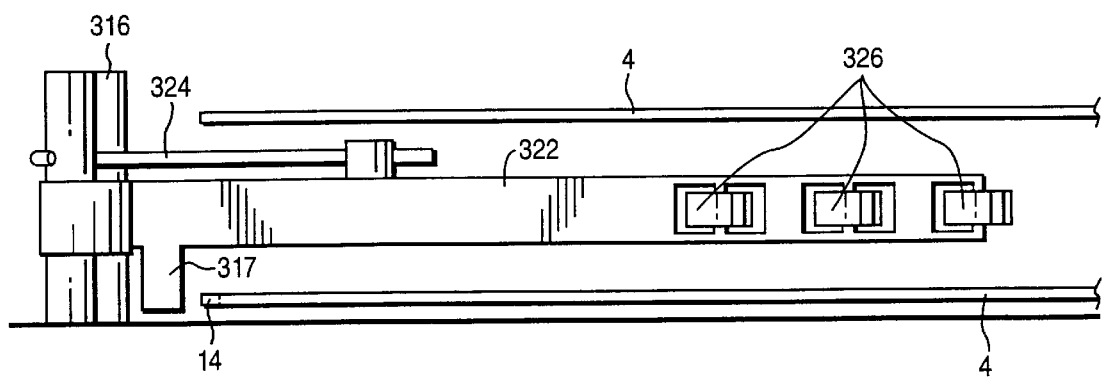
FIG. 21 is a side elevation view along line 21—21 in FIG. 19.

FIGS. 19–21 illustrate a third exemplary embodiment according to the present invention. Here, the proximal end of roller-follower arm 322 is pivoted at 316 and utilizes an integral locking pawl 317 near its proximal end. The pivot 316 may also preferably be located near the middle of the cartridge (i.e., about 180° around the take-up reel 6 from the position shown in FIG. 19) so as to reduce the possibility of removal of the locking assembly (e.g., by sawing off an entire corner of the cartridge).

According to this third embodiment, follower arm 322 is pivotally secured to the housing at pivot 316 adjacent take-up reel 6. The follower arm 322 is biased toward the tape (counter-clockwise in FIG. 19) by spring 324. The spring 324 may be configured in any suitable known manner, and the details of the arrangement will not be further described.

A locking pawl 317 is commonly pivoted with follower arm 322 and, at some ranges of motion, moved in tandem with arm 322 (e.g. by virtue of a spring-biased hinge stop there between so as to bias the pawl 317 towards a minimum angular position with respect to arm 322). That is, at some point during the play cycle, the locking pawl 317 pivots with follower arm 322 and engages teeth 14 so as to prevent a rewind operation (while yet permitting continued rewind on supply reel 4 to effect cartridge ejection). The follower arm 322 is preferably provided with one or more rollers 326 at its distal end. The rollers 326 roll against the spooled tape as it is being fed from (or rewound to) take-up reel 6. Three of the rollers 326 are secured to follower arm 322 in the particular exemplary embodiment of FIG. 19 so that at least one roller will be in contact with the tape regardless of the angular orientation or position of follower arm 322.

In operation, as the tape is fed from supply reel 4, follower arm 322 is urged by spring 324 to pivot about pivot 316 to maintain contact with the tape. Almost one complete play cycle is permitted (e.g., until 15 or 30 minutes from the end) while pawl 317 is restrained. However, at some predetermined time towards the end of the first playback cycle, locking pawl 317, which is now in tandem with follower arm 322, engages teeth 14 in reel 6 (which are already present so as to engage with pawl 312). In one embodiment, the predetermined time corresponds to about 30 minutes of video play time, but it could be any desired predetermined value as will be appreciated. When engaged, locking pawl 317 is configured to permit ratchet-like continued play rotation of take-up reel 6 while preventing it from being rewound thereafter. In this manner, prior to reaching the predetermined time, a user can completely rewind and fast forward the tape in the conventional manner. However, once the predetermined substantial completely play cycle time has been reached, there can be no further rewind of take-up reel 6, and the video can thus be watched in its entirety only once.

Figure 22:
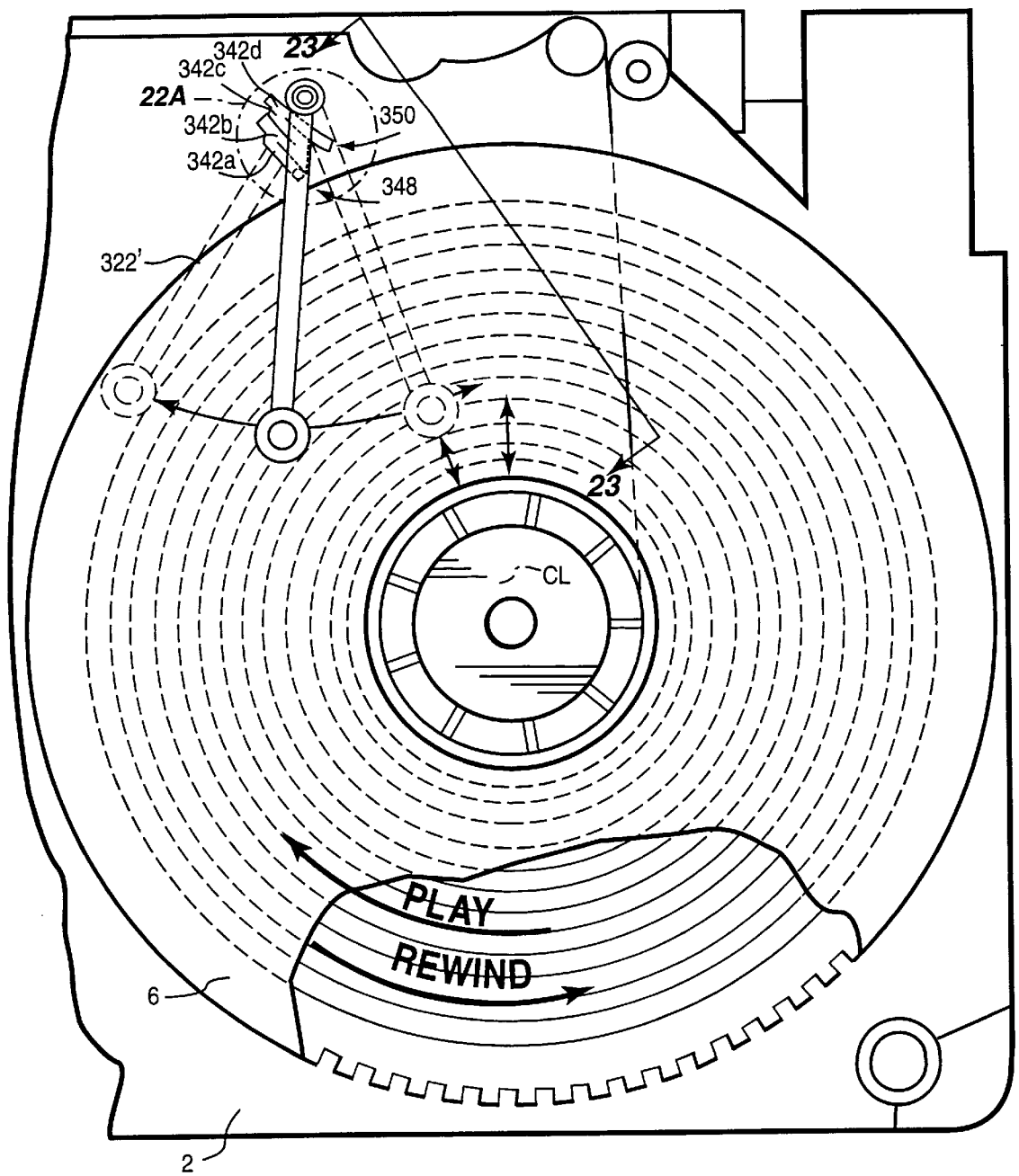
FIG. 22 illustrates structure according to a fourth exemplary embodiment of the invention.
Figure 22A:
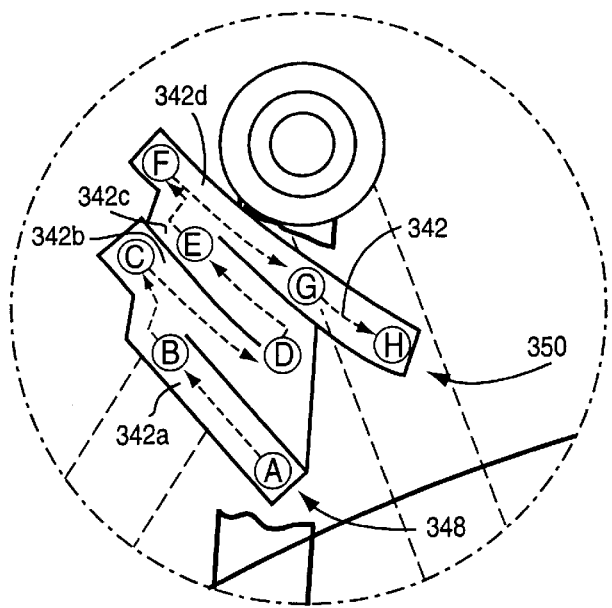
FIG. 22A is a close-up view of the track shown in FIG. 24.
Figure 23:
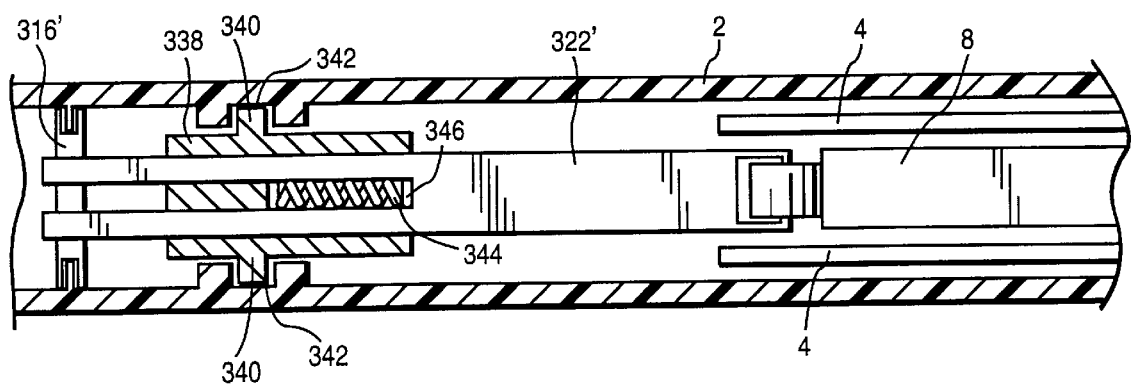
FIG. 23 is a side elevational view taken along line 23—23 in FIG. 22.

A fourth exemplary embodiment according to the present invention is illustrated in FIGS. 22, 22A and 23. This embodiment allows the user almost two complete viewings of the video before follower arm 322' is displaced beyond centerline CL toward a stop abutment. However, the number of viewings can be controlled by adding sections of the track before follower arm 322' is displaced beyond centerline CL.

In this embodiment, a movable carriage 338 is slidably coupled onto the follower arm 322'. The carriage 338 includes one or more projections 340 (e.g., pins) that are engaged within track 342 defined in housing 2. As shown in FIG. 22A, the track 342 is substantially Z-shaped defining a first viewing path 342a (from station A to station C), a rewind path 342b (from station C to station D) and a second viewing path 342c (from station C to station F). The movable carriage 338 is urged toward the pivot 316' by spring 344 mounted in channel 346 formed in follower arm 322'. The track 342 defines a first abutment stop 348 (at station A prior to centerline CL) and a second abutment stop 350 (at station H past centerline CL).

In operation, the follower arm 322' starts in its starting position A when take-up reel 6 is empty. As the tape is unwound from supply reel 4, follower arm 322' is pivoted along its pivoting path (shown by the clockwise directed arrow) in FIG. 22 away from centerline CL. During a first viewing, projections 340 are engaged with track 342 to follow along the first viewing path 342a. At the end of the first viewing, the projections 340 are at position C and prevent the follower arm 322' from being displaced beyond centerline CL and spring 324 holds arm 322' against the beginning of track 342b. Thus, if a rewind operation begins at any time even up until the end of the tape, the arm will be allowed to pivot back under spring bias by the decreasing spooled tape radius and rotated counter-clockwise back to its starting angle at station D because the projections 340 are urged from the first viewing path 342a (towards the pivoted proximal end of arm 322') into first rewind path 342b by spring 344. Accordingly, when a rewinding operation is performed beyond point B (e.g., some predetermined time like 30 minutes significantly before the end of the movie so as to prevent the user from avoiding entry to the final viewing path 342c by merely stopping motion slightly before the very end of the movie), the projections 340 are guided in the rewind path 342b of the track 342 onto the final viewing path 342c.

When the video is fully rewound after a first viewing, projection 340 is thus shifted from the rewind path 342b to the second (e.g., final in the exemplary embodiment) viewing path 342c—again by the spring 344 and the arcuate motion of follower arm 322'. As the video is viewed the second time, follower arm 322' is guided along the pivoting path by spring 324 while projections 340 are engaged in the second viewing path 342c of track 342. This path 342c, however, now guides projections 340 onto the final rewind path 342d which extends beyond centerline CL to station D such that when the tape is played again after reaching a predetermined point of tape, follower arm 322' being displaced past the centerline CL is urged against the second stop abutment 350 (i.e., by spooled tape accumulating on take-up reel 6). After a predetermined amount of tape has been played follower arm 322' causes the VCR motor to terminate playback due to the increased torque imposed on the motor.

With this arrangement, a user is given totally unlimited stop, start, forward and rewind operations in segments during a predetermined number of viewings—while preventing substantial playback thereafter.

Figure 24:
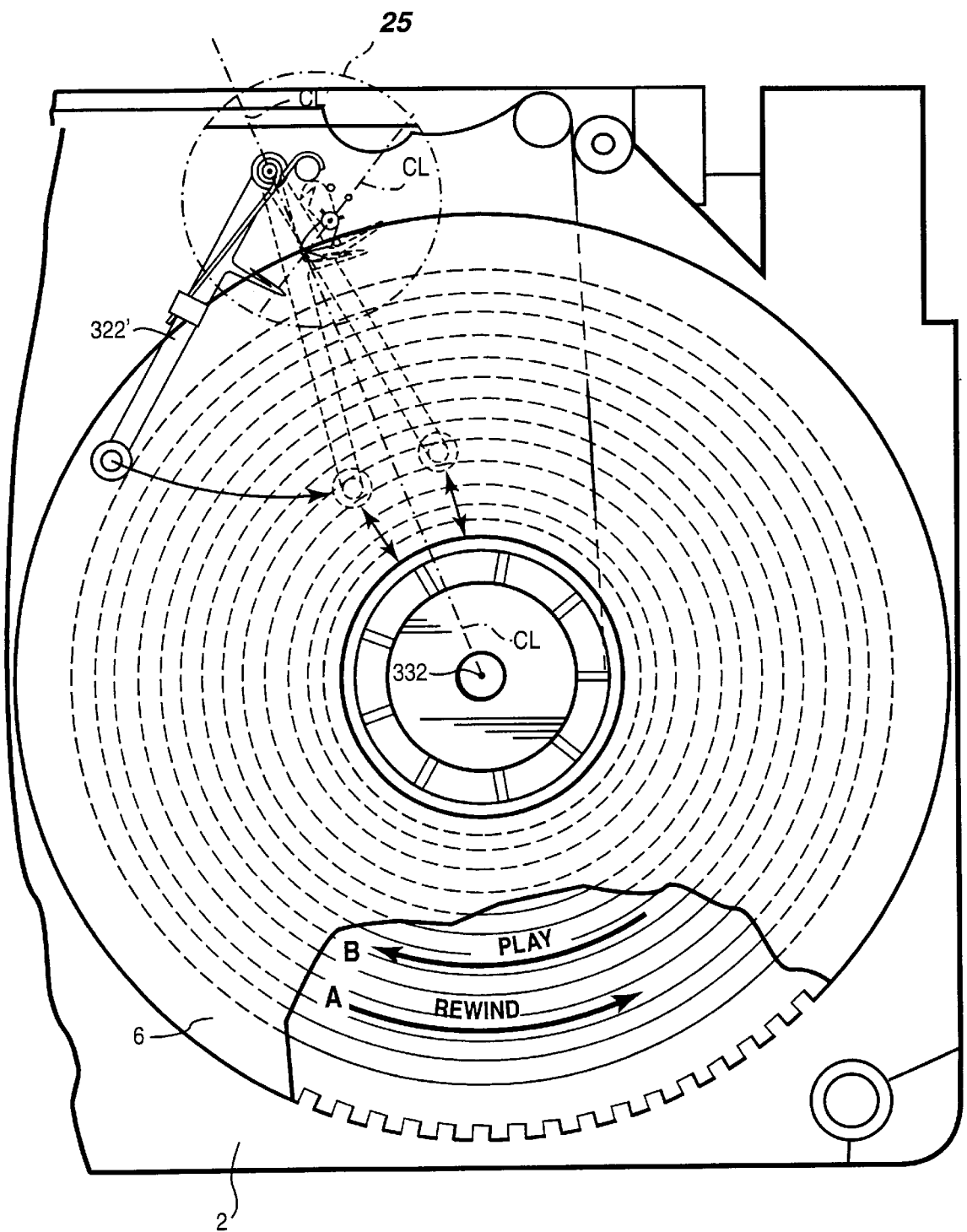
FIG. 24 illustrates structure according to a fifth exemplary embodiment of the invention.
Figure 25:
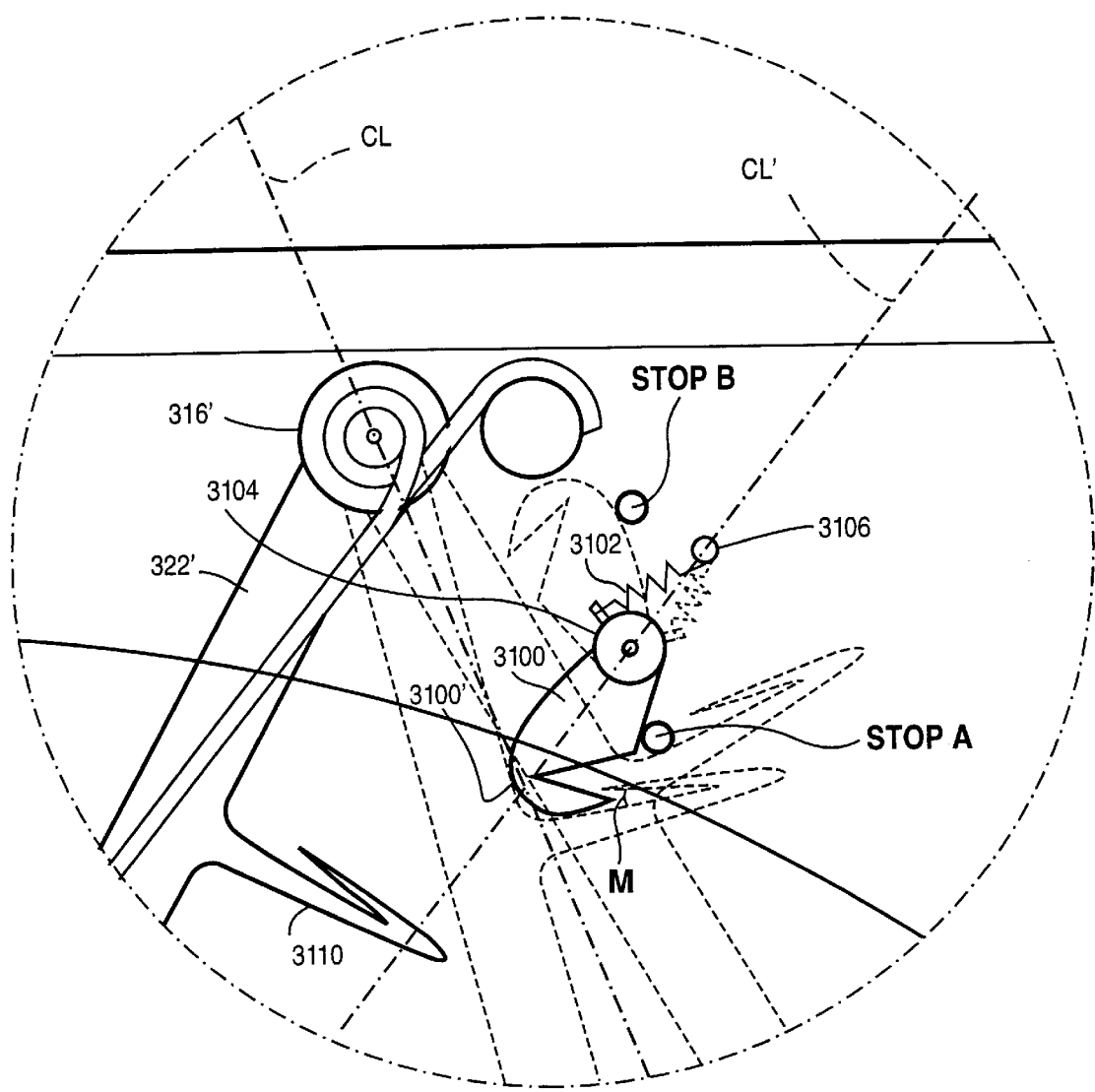
FIG. 25 is a close-up view of the over-center stop arm and over-center follower arm shown in FIG. 24.

In the double over-center embodiment of FIGS. 24 and 25, follower arm 322" is stopped by a portion of the stop arm

3100 during the first play cycle. The stop arm 3100 itself is biased counter-clockwise by a compression spring 3102 against stop A which is displaced slightly to one side of a second centerline CL' defined by a line between its pivot point 3104 and the point 3106 to which spring 3102 is affixed. As will be appreciated, the stop portion 3100' of stop arm 3100 is located prior to the follower arm centerline CL in this position. Of course, there are numerous other equivalent ways to achieve the same desired structure, function and result. For example, the stop arm 3100 may be less than full height so as to leave room for a tension spring to pass over (under or through) it in biasing the arm to one side or the other of centerline CL'. Different locations for the spring anchor 3106 may be used, sliding mechanisms and the like may all be alternatively employed.

However, when the follower arm 322" was placed in this first stop position (e.g., during manufacture after the initial record and rewind operations), an integral catch 3110 slightly flexes to pass below stop arm 3100 so as to catch its distal end (without, of course, yet dislodging the stop arm 3100 beyond its centerline CL'). Then, during the first subsequent playback cycle, catch 3110 on the follower arm 322" will engage the distal end of stop arm 3100 and rotate it to the other side of its centerline CL'. Now compression spring 3102 biases stop arm 3100 to rotate in a clockwise direction. Thus, stop arm 3100 will snap over against stop B (as shown in dotted line) and expose stop A for subsequent stopping of the follower arm 322" past centerline CL during the next rewind cycle.

Follower arm catch 3110 is relatively thin and flexible and therefore the stop arm 3100 will rotate counter-clockwise during the initial setting, if at all, by less than M. Thus, even if there is some slight counter-clockwise rotation of stop arm 3100 during initial setting, it will not dislodge it past centerline CL'. However, during a subsequent playback cycle after T-X tape has been played, because of the relative shape and dimensions of follower arm catch 3110, and the ratchet cut of stop arm 3100, it will be pulled over centerline CL'.

Operational results of this embodiment are thus essentially the same as with the previous embodiment using a spring loaded carriage on the follower arm in conjunction with a Z-shaped track. However, this FIGS. 24, 25 double over-center embodiment uses fewer dimensionally critical parts and therefore may be less expensive to manufacture and also may be easier to reset for another cycle of limited use. Of course, as will be appreciated, there are virtually unlimited variations on these over-center embodiments that can be devised to take advantage of the simple, effective, reliable over-center snap action phenomenon.

Figure 26:
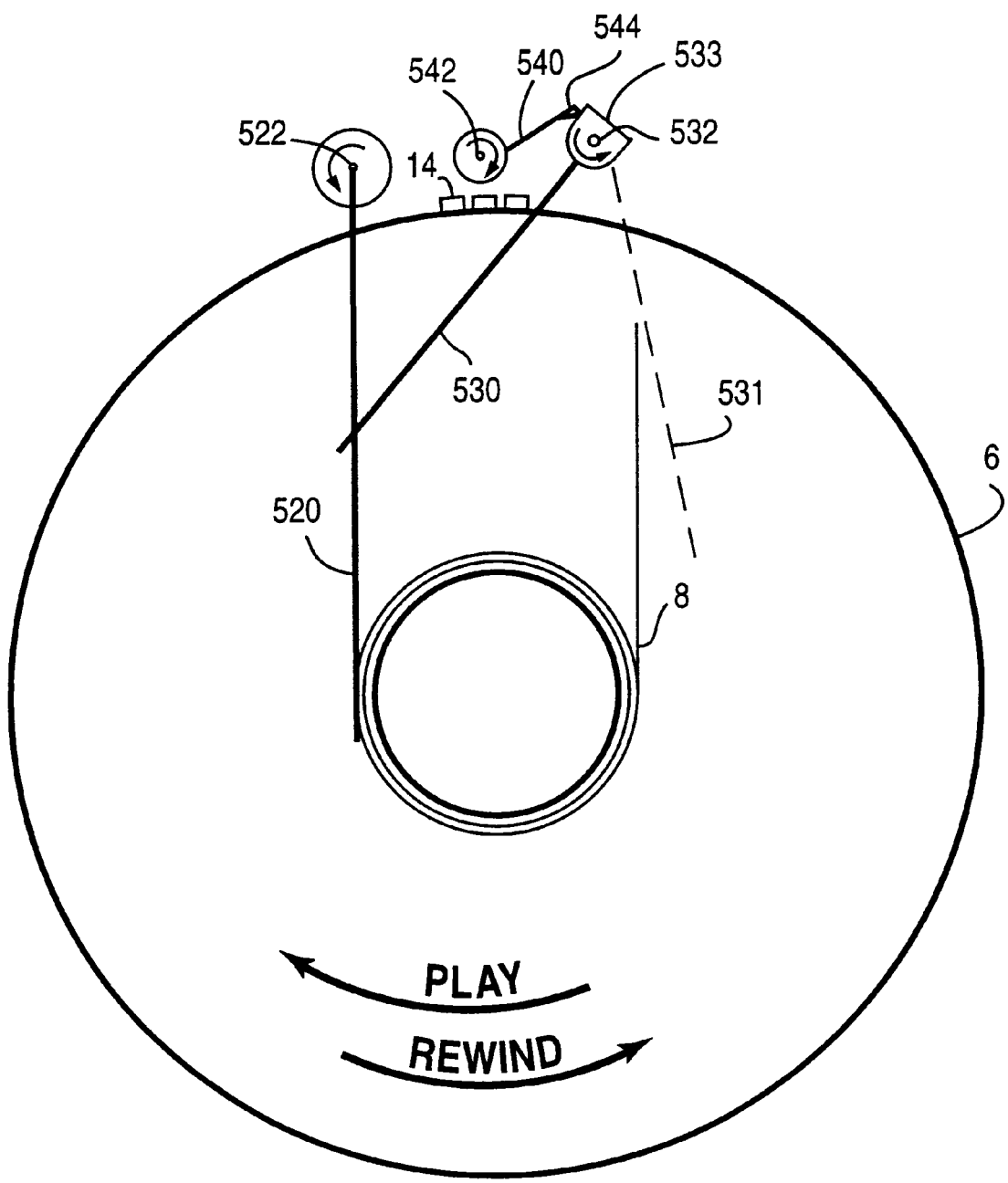
FIG. 26 is a schematic depiction of a sixth exemplary embodiment using three pivoted arms.

FIG. 26 schematically depicts a sixth exemplary embodiment using three pivoted arms: a longer following arm 520 pivoted at point 522, a shorter interlocked arm 530 pivoted at 532, and a separate still shorter ratchet pawl arm 540 pivoted at 542. The interlocking relationship between arms 520 and 530 may be, for example, of the type depicted in the exemplary embodiment of FIGS. 9–18. Accordingly, during the first play cycle, the take-up reel 6 has an increasing radius of spooled tape and thus causes the long arm 520 to rotate in a clockwise sense. At some predetermined point, the intermediate length arm 530 will be released from interference with arm 520 and will also ride against the spooled tape and rotate still further in a clockwise sense. Thereafter, during the first rewind cycle, after a significant amount of spooled tape has been removed from take-up reel 6, the intermediate length arm 530 will be permitted to move under its bias spring force to a neutral spring position 531 (thus undergoing rotation in a counter clockwise sense). During the next playback cycle, the increasing radius of spooled tape on take-up reel 6 will gradually cause the intermediate length arm 530 to move further in a counter clockwise sense until a cut-away or flat cam area 533 rotating with arm 530 permits the clockwise biased ratchet arm 540 to pass thereby in clockwise rotation so as to engage ratchet pawl 544 with teeth 14. Once this engagement occurs, then no further rewind cycle is permitted (except on the supply reel 4 side, of course, to permit normal cassette ejection processes to occur).

Figure 27:
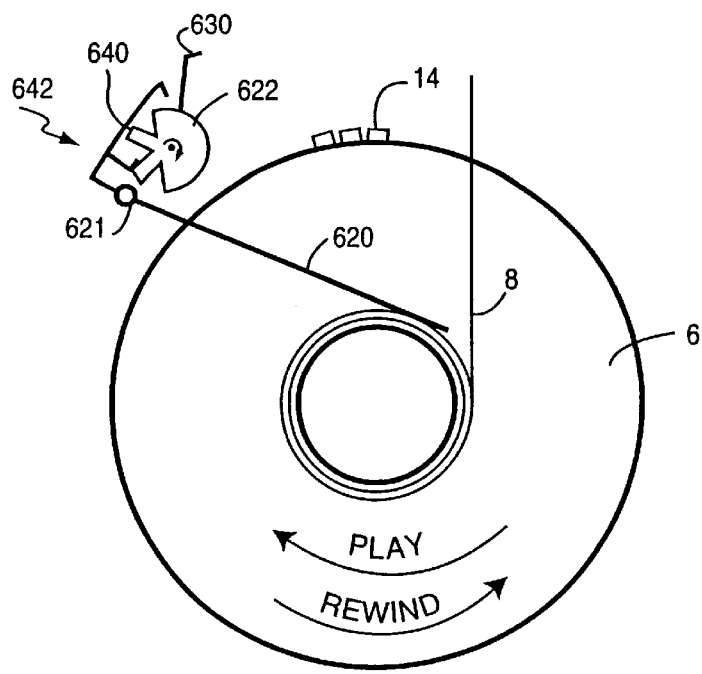
FIGS. 27 and 27a–27d are schematic depictions of a seventh exemplary embodiment using a spring biased ratchet wheel and escapement mechanism.

FIGS. 27 and 27A–27D schematically depict a seventh exemplary embodiment using the spring biased ratchet wheel 622 and follower arm/escapement mechanism 620 on take-up reel 6. As can be seen in FIG. 27, the ratchet wheel 622 is biased to rotate in a clockwise direction and includes an integral short lever and ratchet pawl 630 extending from a point on its periphery for eventual engagement with ratchet teeth 14 after the ratchet wheel 622 has been permitted to rotate sufficiently in a clockwise direction. However, rotation of the ratchet wheel 622 is initially restrained by a toothed surface of the ratchet wheel being trapped within the escapement mechanism 642 (integral with follower arm 620 opposite its pivot point 621).

Figure 27A:
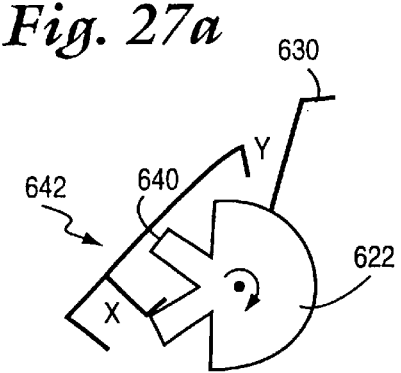
Figure 27B:
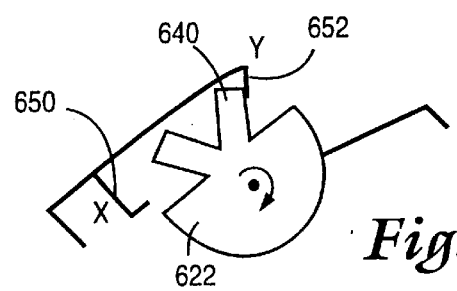

The take-up reel 6 and escapement mechanism 642 are shown in FIG. 27 at a typical position for the beginning of the first play cycle. This same position is depicted in FIG. 27A for the escapement mechanism 642 and ratchet wheel 622. During the first play cycle, the restraining left hand or X escapement bracket 650 moves to the left as follower arm 620 is caused to undergo counterclockwise rotation. This ultimately releases ratchet wheel 622 to make a first incremental rotation in the clockwise direction until it is again restrained—now by the right hand Y escapement bracket 652. This position is depicted at FIG. 27B. As will be appreciated, the relative dimensions of the escapement brackets and ratchet wheel 622 may be configured so as to cause this condition to occur at any desired time during the first tape play cycle. However, in the preferred exemplary embodiment, this condition occurs at approximately 30 minutes before the end of the first play cycle.

Figure 27C:
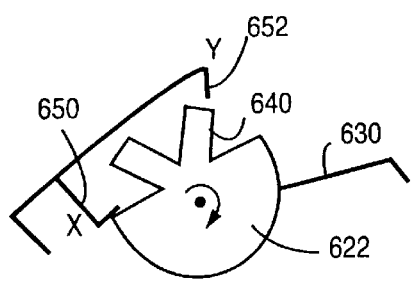
Figure 27D:
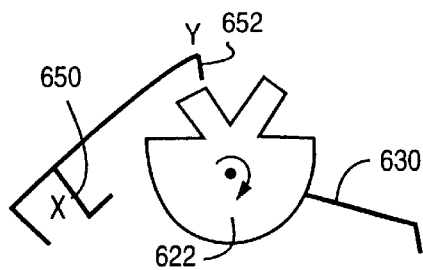

After the first play cycle has been completed, the next subsequent rewind cycle will, of course, cause the follower arm 620 to again undergo clockwise rotation as the radius of spooled tape on take-up reel 6 diminishes. At some point (e.g., 30 minutes from the beginning of the video tape), the right hand Y escapement bracket 652 will be moved sufficiently towards the right (as the arm 620 pivots in a clockwise sense) to release the first ratchet wheel tooth 640. At the same time, the left hand X escapement bracket 650 catches again on a toothed surface of ratchet wheel 622 and thus still prevents the ratchet pawl arm 630 from fully rotating into engagement with ratchet teeth 14 on the take-up reel 6. This condition is depicted at FIG. 27C. However, during the following or second play cycle, as arm 620 is caused to undergo counter clockwise rotation, the left hand X escapement bracket 650 again releases the ratchet wheel 622 (e.g., at around 30 minutes before the end of the second play cycle). This condition is depicted at FIG. 27d and ratchet wheel 622 will be fully released as arm 620 again moves in a clockwise sense thus permitting the ratchet pawl arm 630 to now come into engagement with the teeth 14 of the take-up reel 6, this condition permits further play but prevents any further rewinding (except that which must occur on the supply reel 4 so as to permit normal cassette ejection processes to occur).

In the possible commercial embodiment of FIGS. 28A–28E, the follower arm 420 and transverse arm 470 of the FIGS. 2–8 embodiment have been replaced with an expanded "release" arm 800 having curved external edges 802 and 804 for contact with spooled tape on take-up reel 6 and supply reel 4, respectively. In addition, pin 450 (on the long arm 420) has now been replaced by pin 806 on ratchet arm 808 and the pin track 458 (defined by projecting walls 452, 454 and 456 on ratchet arm 430) has now been replaced by track 810 defined by projecting walls 812, 814, 816, 818, 820, 822 and 824 (shown in more detail at FIG. 28E).

As depicted by arrows 830 and 832, ratchet arm 808 and releaser arm 800 are both spring biased in the counterclockwise direction about respective pivot points 833 and 834.

Figure 28A:
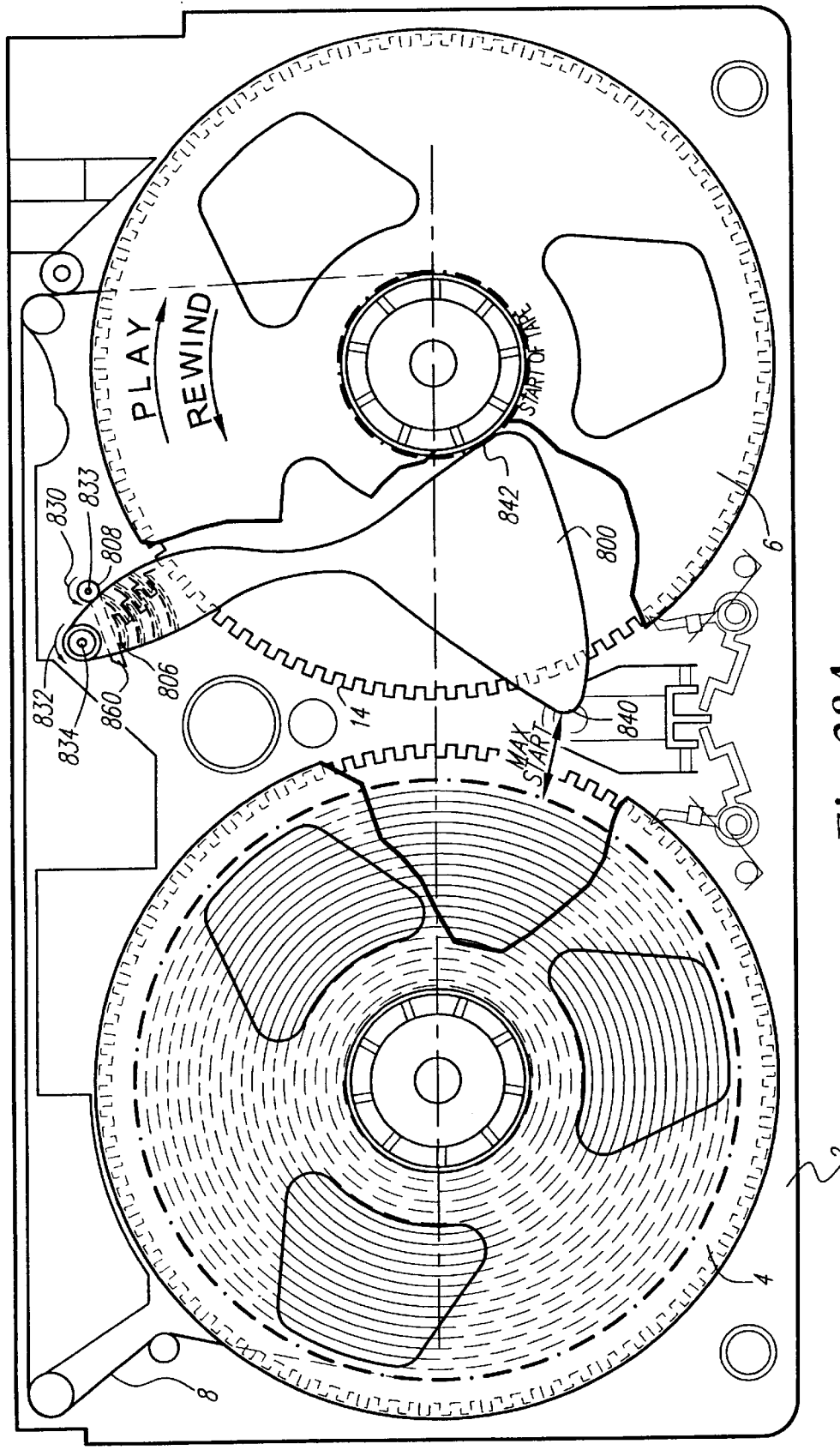
FIGS. 28A–28E depict a possible commercial embodiment having an expanded follower or "release" arm with a curved exterior surface to contact the spooled tape and a cycle-measuring "locking" arm carrying a pin traversing a path defined by projecting walls on the follower arm.
Figure 28B:
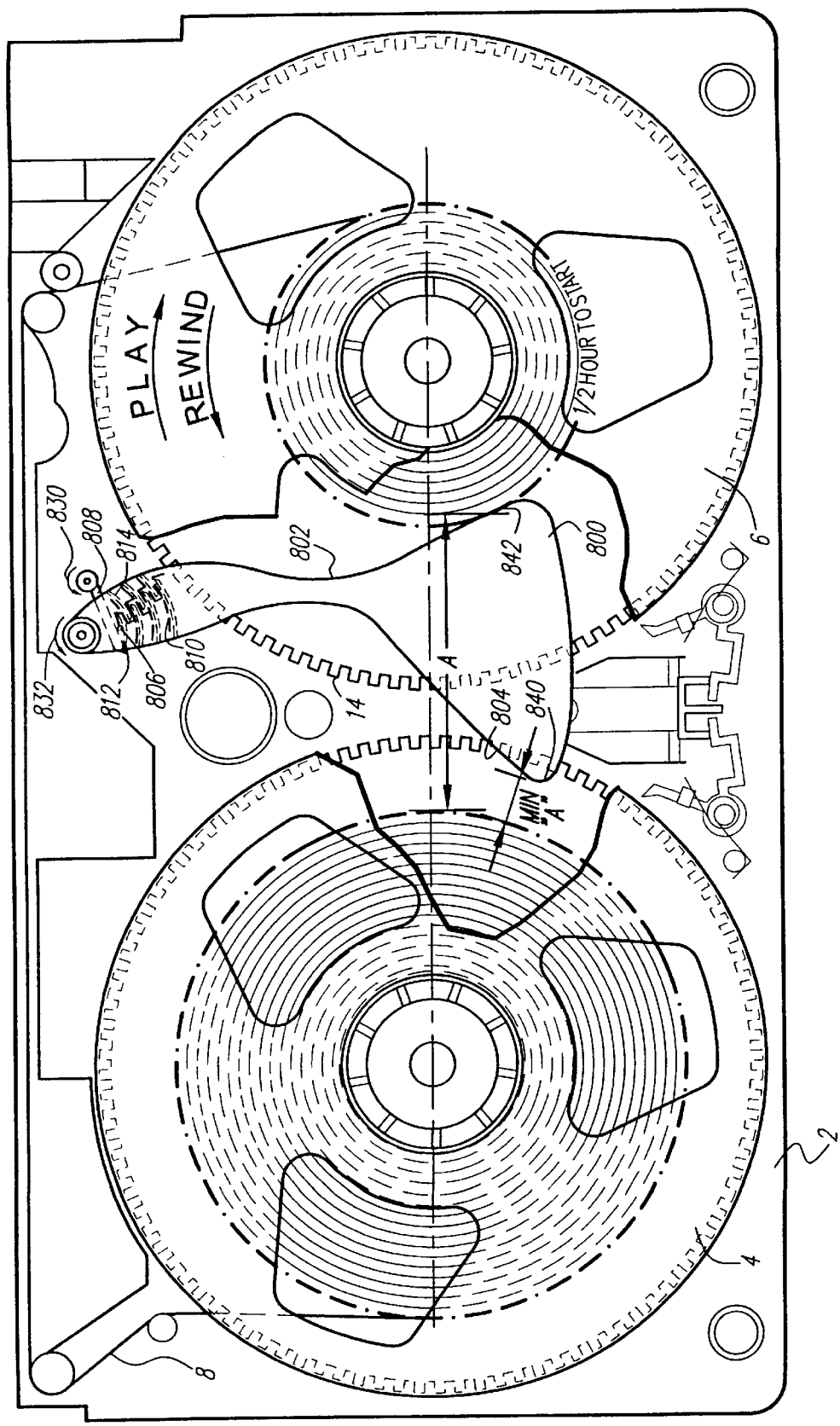

Accordingly, at the outset of a play back (or the initial record) cycle, pin 806 rests on top of wall 812 at station A (e.g., to the left as depicted in the drawings). This starting position is depicted at FIGS. 28A and 28E and as will now be demonstrated, a maximum clearance then exists between the stabilization lobe 840 of the release arm 800 and the spooled tape on supply reel 4. The follower lobe 842 of release arm 800 is of course biased into contact with the very small amount of spooled tape on the take-up reel 6. As the initial play back (or record) cycle proceeds (e.g., to approximately one-half hour after its start as depicted in FIG. 28B), pin 806 slides along the upper portion of wall 812 to station B as also shown in FIG. 28E. It will be noticed that the clearance between the stabilization lobe 840 and the spooled tape on supply reel 4 is now somewhat diminished. It will also be noticed that a slightly different portion of the curved edge 802 is now in contact with the spooled tape on take-up reel 6 at the follower lobe 842.

Figure 28C:
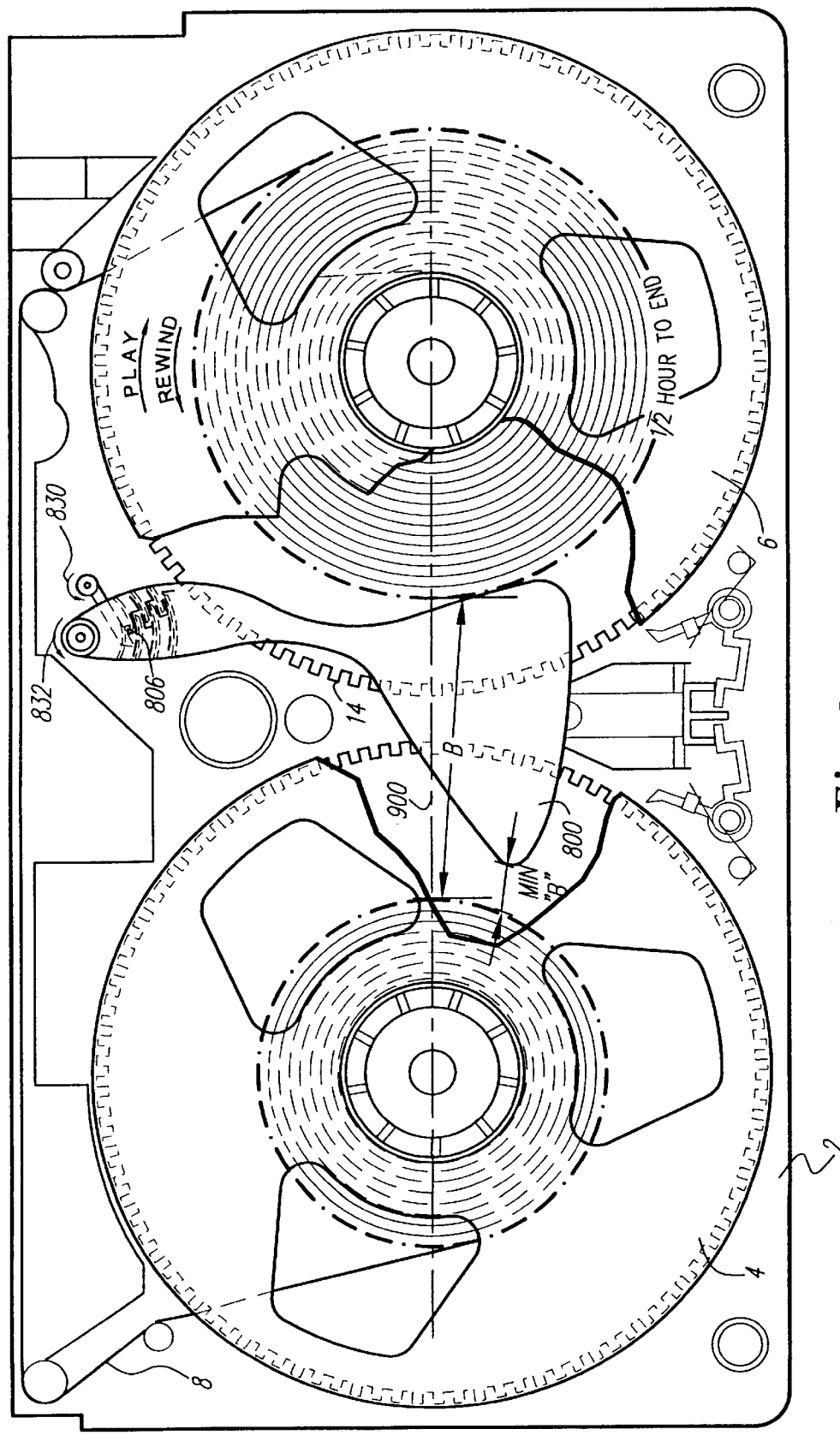
Figure 28D:
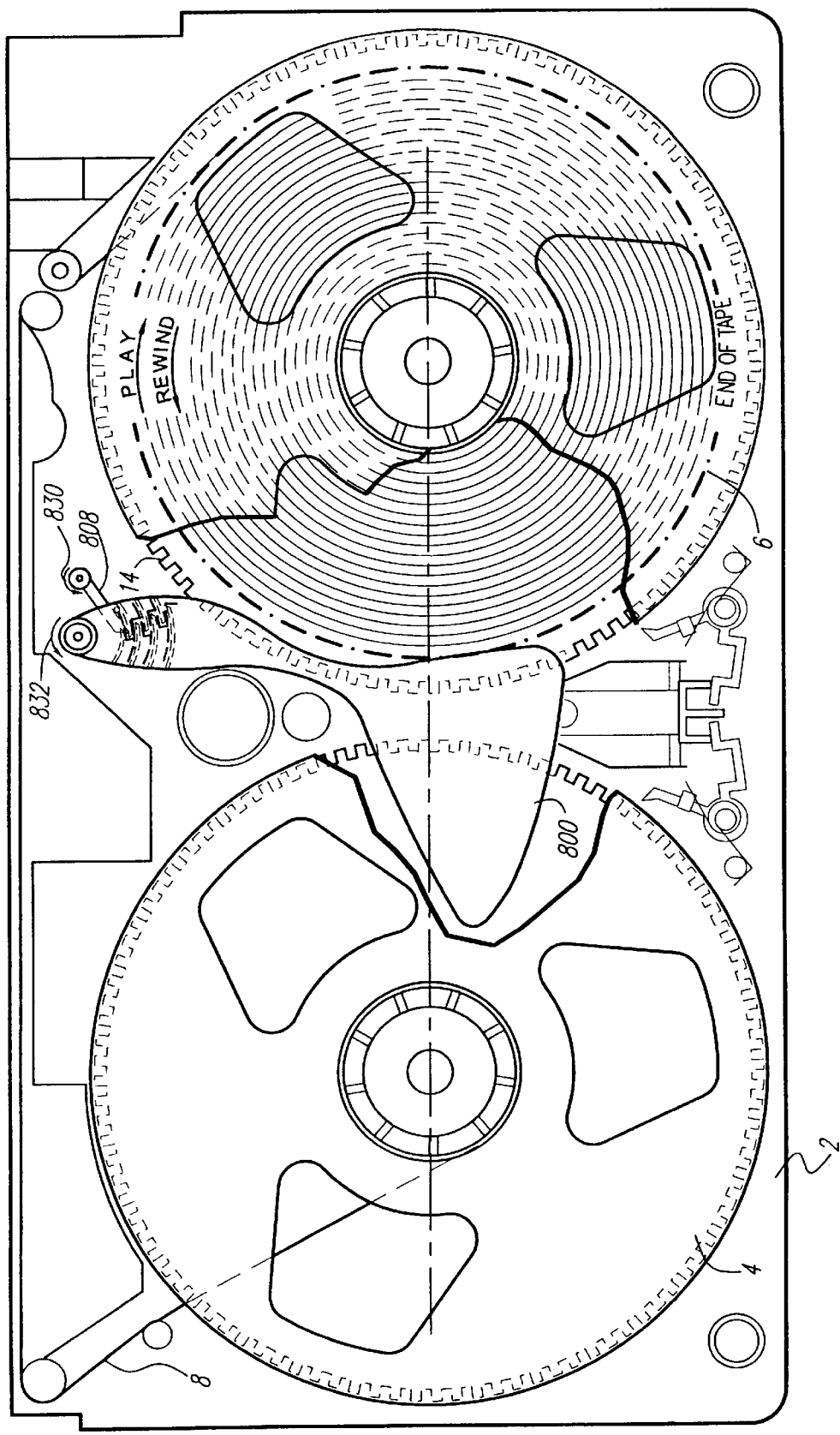
Figure 28E:
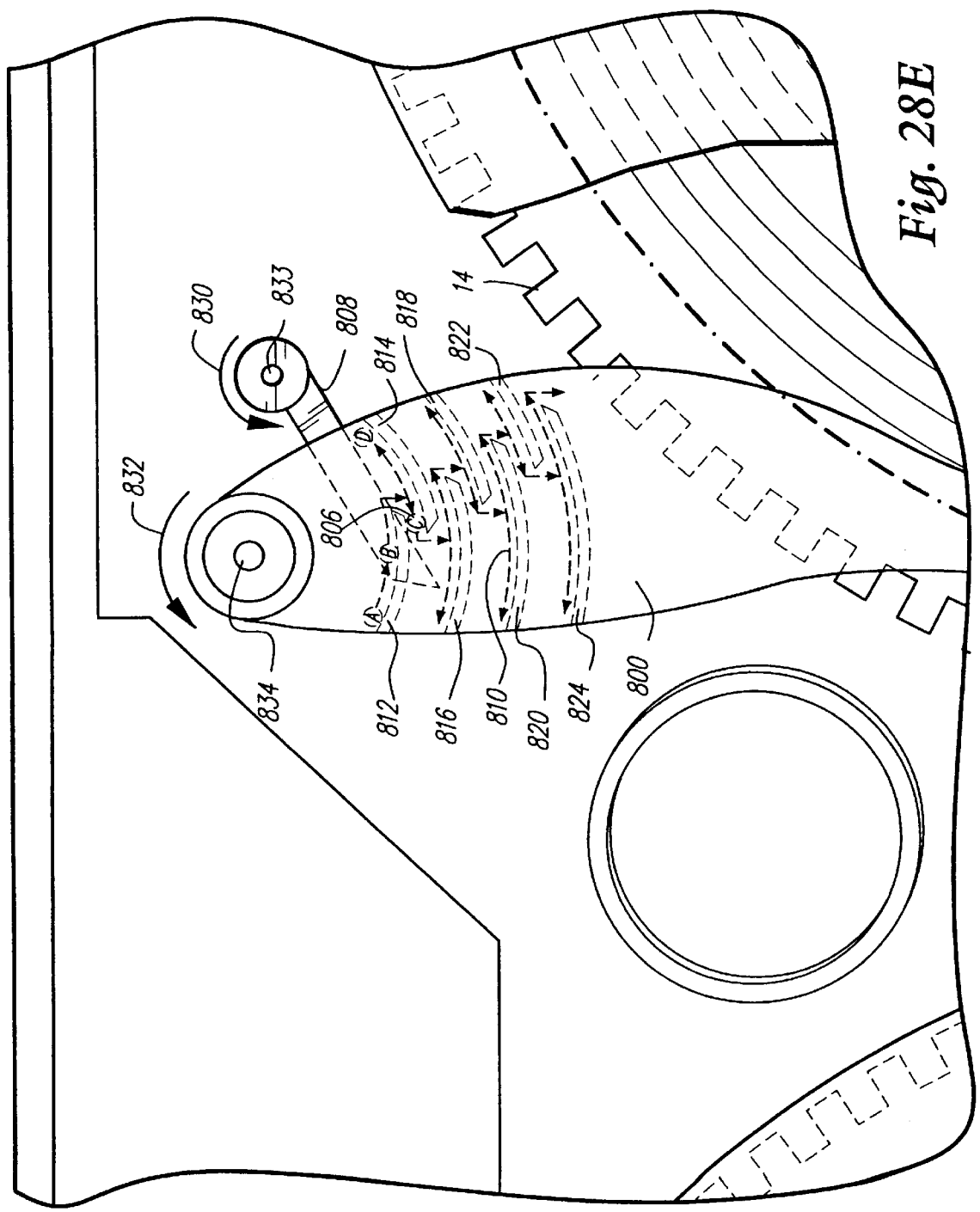

Eventually (e.g., at one-half hour before the end of the tape as depicted in FIG. 28C), the pin 806 will pass beyond the end of wall 812 and thus permit the ratchet arm 808 to incrementally rotate in a counterclockwise direction so that the pin now rests on the upper side of the next wall 814 (at station C as shown in FIG. 28E). As this first play back (or record) cycle continues to its ultimate conclusion (e.g., as depicted in FIG. 28D), the pin 806 will ultimately rest on the upper right hand side of wall 814 at station D (e.g., see also FIG. 28E).

As should now be appreciated, during the next rewind cycle, the pin will be caused to pass off the left end of wall 814 onto the left side of wall 816 in readiness for the next cycle. As can be better appreciated from the enlargement at FIG. 28E, the walls 812–824 thus define zig-zag track 810 which, in this exemplary embodiment, permits three complete cycles plus one further play back cycle before the pin 806 passes beyond the right hand edge of the final wall 824. This then permits pawl 860 at the end of ratchet arm 808 to rotate into contact with the teeth 14 on play back reel 6 and thus prevent any further rewind operations. This configuration would permit, for example, an initial record and rewind cycle during manufacture followed by two complete unfettered play back and rewind cycles by the user before a final play back cycle is permitted without further rewind.

As should now be appreciated, FIGS. 28A–28E show the release arm 800 in four different successive positions of a single half cycle (e.g., an initial play back or record cycle). Although the drawings are not intended to be accurate scale drawings, those in the art will appreciate that the approximately one-third points on the spooled tape reel (e.g., approximately one-half hour after starting and one-half hour before the end) also define minimum distances between the reeled tape on reels 4 and 6. As depicted in the drawing, minimum distance A and minimum distance B represent minimum separation points between the stabilization lobe 840 of release arm 800 and the reeled tape on supply reel 4.

It will be noted from FIGS. 28A–28D that at no time is there any contact between any part of release arm 800 and the spooled tape above line 900 drawn between the centers of reels 4 and 6. Such shaping of the release arm 800 and curvature of its external surfaces in contact with spooled tape provides several advantages. It not only maximizes the strength of the combined expanded release arm 800, it also minimizes arm movements which in turn permits the arm never to pass over center line 900. This hopefully prevents (or at least minimizes) the possibility that the release arm might be "pulled around" the spooled tape (e.g., on the supply reel during rewind operations) when the stabilization lobe 840 is actually in contact with the rapidly spinning spooled tape on reel 4).

By so joining the ends of the stabilization arm 470 and follower arm 420 (from the embodiment of FIG. 2 et seq.), and maximizing distance across the expanded arm structure at other points, the arm structure is significantly strengthened while at the same time minimizing free movement of the release arm 800 (e.g., during shipping or other transport movements where the arm 800 might move within the minimum distance to the respective spooled tape).

Figure 29:
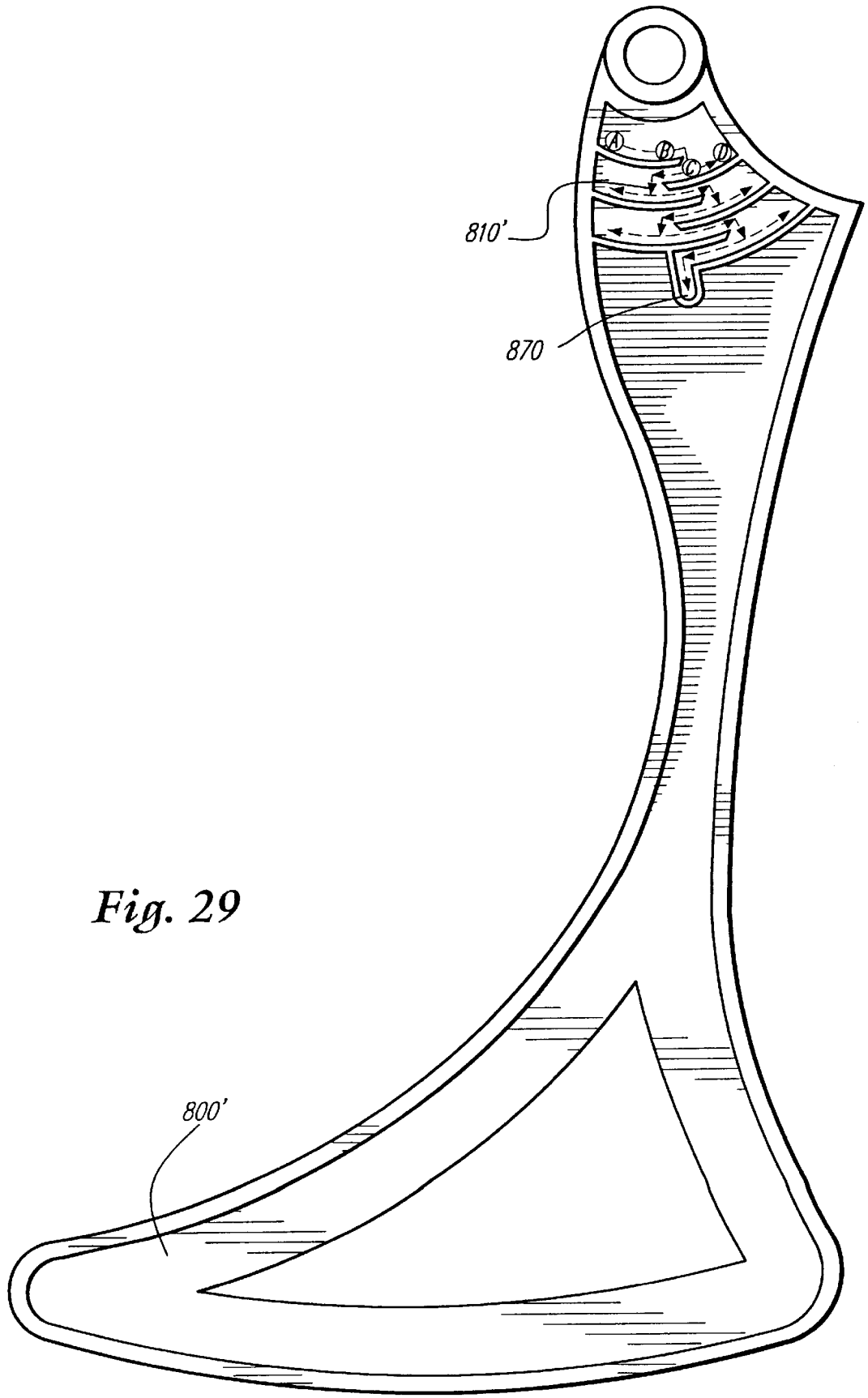
FIG. 29 depicts a modified form of the expanded follower arm of FIGS. 28A–28E.

A modified release arm 800' is depicted in FIG. 29. Here, path 810 for pin 806 ends in a blind dead end 870. Accordingly, the ratchet arm 808 is never permitted to actually rotate sufficiently to contact teeth 14. However, once the pin 806 becomes trapped in pocket 870 (e.g., during the third rewind cycle in the exemplary embodiment of FIG. 29), then the release arm 800' itself becomes immobilized so as to thereafter "lock up" and prevent further substantial rewind and/or play back tape motion (e.g., because the spooled tape will experience increasing torque as its radius increases against the contacted portion of the immobilized "release" arm 800').

Figure 31:
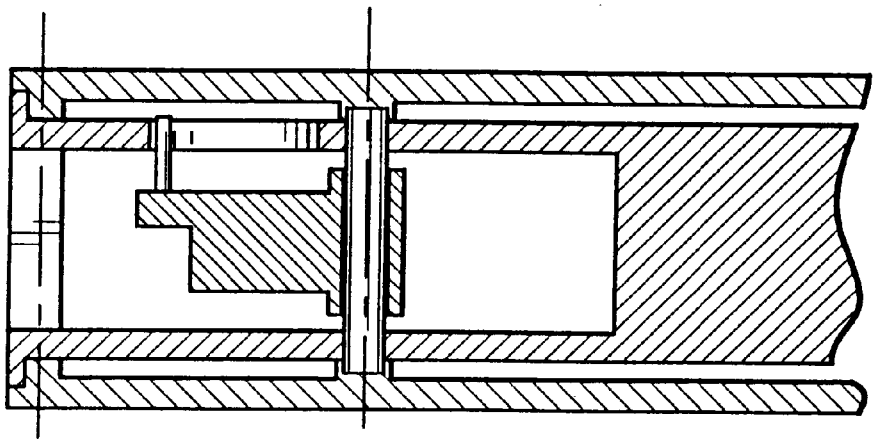
FIGS. 30–32 depict another possible commercial embodiment wherein the cycle-measuring path is defined by slots in the expanded follower arm and wherein indicia on the cycle-measuring locking arm are visible through an aperture in the housing to show the number of remaining legitimate play cycles.
Figure 30:
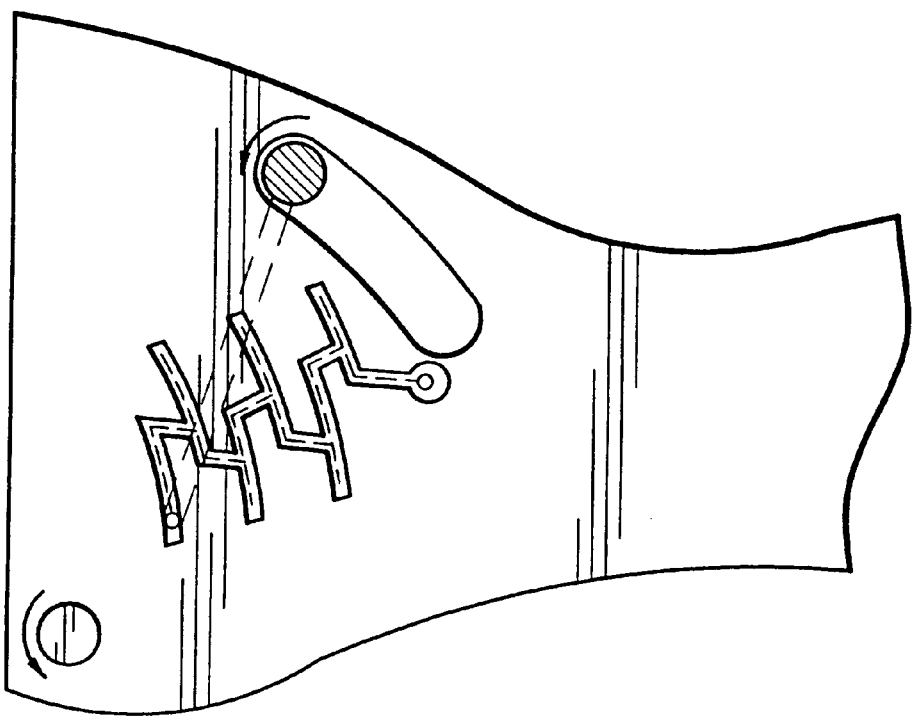
Figure 32:
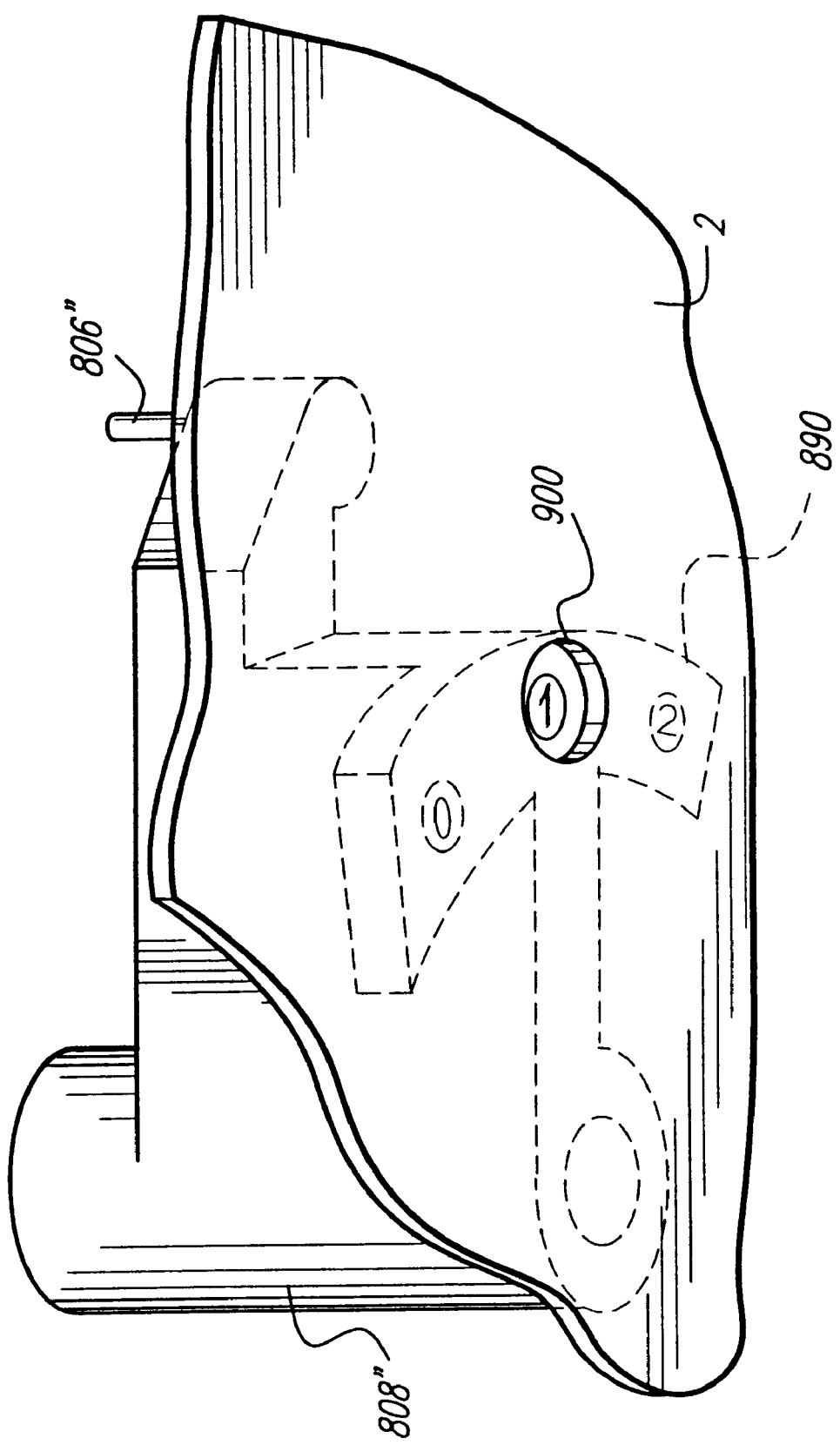

A still further modified release arm 800" is depicted in the embodiment of FIGS. 30–32. Here, pin 806" of arm 808" follows track 810" defined by a series of interconnected slots 880 formed in a portion of the release arm 800" itself. In this exemplary embodiment, the base portion of release arm 800" includes a hollowed out or bifurcated area 801 enclosing the cycle-counting arm 808"—and thus further reducing opportunities for easily defeating the limited use mechanism (e.g., by immobilizing arm 808" and thus preventing pin 806" from ratcheting downward along path 810" during successive play back/record/rewind cycles). To accommodate this internal moving mechanism of arm 808" and pin 806", a further slot 882 is formed in the release arm 800" so that the pivotal axis of the rotatable arm 808" can be supported by the cassette housing 2.

As depicted in FIG. 32, the cycle-counting arm 808" may include a flange or other structure 890 on which indicia (e.g., the numerals 0, 1, 2, et seq.) can be viewed through one or more suitable apertures 900 of the housing 2 if not obstructed by the bifurcation feature of this embodiment (e.g., if this possible security aspect of this exemplary embodiment is not utilized so as to leave a movable portion of the cycle-counting arm 808" adjacent housing 2). As will be appreciated by those in the art, by suitably locating successive indicia which move with cycle-counting arm 808" and the aperture(s) 900, a visible indication of the number of remaining legitimate uses of the cartridge may be displayed.

In each embodiment, the limited-use tape cassette according to the present invention can be, if desired, simply discarded after its authorized limited use, thereby eliminating potential late return fees and administration of delinquent accounts, checking and restocking, etc. As an alternative, the used-up tape cartridge can be dropped off at a recycling station where the cartridge may be able to be reset (e.g., by a special tool or vacuum resetting jig which moves the arm(s) back to the start position for re-sale.

Although some arrangements are illustrated as restraining supply reel 4 or take-up reel 6, it will be appreciated that the invention typically may be adapted to function in connection with the other reel.

While the invention has been described in connection with what are presently considered to be the most practical and preferred embodiments, it is to be understood that the invention is not to be limited to the disclosed embodiments, but, on the contrary, is intended to cover all modifications and equivalent arrangements included within the spirit and scope of the appended claims.

What is claimed is:

1. A limited-use tape cassette comprising:

a housing enclosing a tape spooled to pass from a rotatable supply reel to a rotatable take-up reel during tape play;

a follower arm pivotally secured at a proximal end with respect to the housing;

said follower arm having a distal end biased to abut spooled tape on one of the reels; and said follower arm being configured to cause limited further tape play after predetermined unrestricted tape play use of the tape cassette.

2. A limited-use tape cassette as in claim 1 wherein:

said one reel includes a plurality of teeth disposed about a periphery thereof; and a ratchet pawl is disposed to engage the teeth and thereafter permit only uni-directional reel rotation when the follower arm motion corresponds to a predetermined unrestricted tape play use of the tape cassette.

3. A limited-use tape cassette as in claim 1 wherein the follower arm comprises a lateral projection directed towards spooled tape on the other of said reels and dimensioned to provide static stability for the follower arm during shipping and handling of the tape cassette.

4. A limited-use tape cassette as in claim 1, further comprising a second rotatable arm with a ratchet pawl biased to move toward peripheral teeth on one of said reels but restrained from engagement with such teeth by the follower arm until after a predetermined unrestricted tape play use of the tape cassette.

5. A limited-use tape cassette as in claim 4 wherein said second arm includes structure defining a track along which a follower pin attached to the follower arm moves to restrain the second arm from engaging said teeth during predetermined unrestricted tape play use of the tape cassette.

6. A limited-use tape cassette as in claim 1 further comprising a second rotatable arm biased to move along a track defined by structure on the follower arm toward a locked position whereat both arms are interlocked and prevented from further substantial movement after a predetermined unrestricted tape play use of the tape cassette.

7. A limited-use tape cassette as in claim 1 wherein a centerline is defined between the rotational center of said one reel and the pivot axis and wherein the follower arm is configured to have a length so that its distal end passes over said centerline when said one reel contains less than a predetermined amount of tape and thereafter abuts a stop to restrain further pivoting of the follower arm.

8. A limited-use tape cassette as in claim 7 wherein the stop abutment is fixed to the housing and disposed past the centerline, the follower arm engaging the fixed stop abutment after the follower arm longitudinal axis is displaced past the centerline thus thereafter preventing the rewinding of more than a predetermined amount of tape.

9. A limited-use tape cassette as in claim 7, further comprising a spring wound about said pivot with ends bearing against the follower arm and the housing so as to urge the follower arm toward the fixed abutment stop.

10. A limited-use tape cassette as in claim 1 wherein:

a centerline is defined between the rotational center of said one reel and the pivot axis and wherein the follower arm is configured to include a movable carriage mounted thereon to also move along a track formed in the housing;

the movable carriage having at least one projection engaged within the track; and the track defining a first abutment stop disposed to stop follower arm pivoting at a point prior to the centerline and a second abutment stop disposed to stop follower arm pivoting at a point past the centerline.

11. A limited-use tape cassette as in claim 10, including a carriage spring disposed to bias the movable carriage to move on the follower arm toward its pivot while its projection is also restrained to move within said track.

12. A limited-use tape cassette as in claim 10 wherein:

the track comprises a first play path, a rewind path, and a second play path;

one end of the first play path defining a stop position disposed prior to the centerline and one end of the second play path defining a stop position disposed past the centerline;

the follower arm, during a first play cycle moving the projection engaged in the track along the first play path, the projection engaging the first abutment stop prior to the follower arm passing the centerline after a first predetermined amount of tape has been fed from said one reel;

the follower arm, during rewinding, moving the projection engaged in the track along the rewind path; and the follower arm, during a second play cycle moving the projection engaged in the track along the second play path, the projection engaging the second abutment stop and restricting further reel rotation after the follower arm longitudinal axis is displaced past the centerline and after a second predetermined amount of tape has been rewound onto said one reel.

13. A limited-use tape cassette as in claim 10 wherein the track comprises a substantially Z-shaped path.

14. A limited-use tape cassette as in claim 1 wherein:

a centerline is defined between the rotational center of said one reel and the pivot axis and when the follower arm is configured to include a catch arm affixed for movement therewith;

a stop arm is spring biased to a first stop position disposed to stop follower arm rotation at a point prior to the centerline; and said catch arm being configured to engage the stop arm during a rewind cycle and move it to a second position which thereafter permits the follower arm longitudinal axis to pivot past the centerline into a final stop position during a subsequent play cycle.

15. A limited-use tape cassette as in claim 1, further comprising:

a stop arm spring-biased to toggle between two over-center positions;

the follower arm being stopped prior to a centerline defined between the rotational axis of said one reel and the pivot axis when the stop arm is in a first one of its over-center positions; and the follower arm being stopped after said centerline when the stop arm is in its other over-center position.

16. A limited-use tape cassette as in claim 15 wherein, said follower arm is configured to move said stop arm from its first over-center position to its other over-center position.

17. A limited-use tape cassette as in claim 15 wherein said follower arm is stopped past said centerline by a fixed stop that is exposed to interfere with said follower arm when the stop arm is moved to its other position.

18. A limited-use tape cassette as in claim 1 wherein:

said follower arm restrains a second follower arm during at least a portion of the unrestricted tape play usage of the cassette; and said second follower arm restrains a third arm having a ratchet pawl until predetermined tape use has occurred but thereafter releases the third arm causing said ratchet pawl to engage one of said reels and permit only its unidirectional rotation thereafter.

19. A limited-use tape cassette as in claim 1 wherein:

said follower arm moves a pair of escapement brackets therewith;

said escapement brackets alternately restraining incremental rotation of a ratchet wheel which, in turn, is coupled to a pawl which engages one of said reels after predetermined rotation of the ratchet wheel.

20. A limited-use tape cassette including a housing enclosing a tape spooled to pass between a rotatable supply reel and a rotatable take-up reel, the limited-use tape cassette further comprising:

a follower arm pivotally secured at its proximal end with respect to the housing for reciprocating arcuate movement along a pivoting path that crosses a centerline defined between the rotational center of a reel and a follower arm pivot axis; and a stop abutment disposed to engage and stop the follower arm after its longitudinal axis is displaced past the centerline.

21. A limited-use cassette as in claim 20, further comprising a spring member coupled with the follower arm, the spring member urging the follower arm toward the stop abutment.

22. A limited-use tape cassette as in claim 21, further comprising a carriage slidably coupled onto the follower arm, the carriage including at least one projection engaged within a track formed in the housing.

23. A limited-use tape cassette as in claim 22 wherein the track defines an intermediate stop abutment disposed to stop the follower arm longitudinal axis prior to the centerline and a further final stop abutment disposed to stop the follower arm longitudinal axis past the centerline.

24. A limited-use tape cassette as in claim 21, further comprising a stop arm spring-biased to toggle between first and second positions defining respective stops for the follower arm that are prior to and past the centerline.

25. A limited-use tape cartridge comprising:

a housing containing a rotatable supply reel and a rotatable take-up reel having a magnetic tape spooled thereon for passage therebetween;

a follower arm pivoted with respect to the housing and having a distal portion biased towards spooled magnetic tape in the supply reel as it is being unwound for play;

a stop abutment disposed to restrain pivotal follower arm longitudinal axis movement beyond a predetermined point that is past a centerline drawn between the supply reel rotational axis and the follower arm pivot axis; and the follower arm having a length along its longitudinal axis which permits the longitudinal axis to pass said centerline when only a predetermined amount of magnetic tape remains on the supply reel.

26. A limited-use tape cartridge as in claim 25 wherein said stop abutment and said follower arm length act to substantially increase rewind torque on the supply reel when a predetermined amount of rewinding occurs after the follower arm longitudinal axis passes said centerline.

27. A limited-use tape cartridge as in claim 26 wherein said follower arm passes said centerline during a first play of the tape.

28. A limited-use tape cartridge as in claim 26 wherein said follower arm passes said centerline during the Nth play of the tape, N being an integer greater than one.

29. A limited-use tape cartridge as in claim 28 wherein the follower arm includes a stop position defining member mounted for sliding movement thereon.

30. A limited-use tape cartridge as in claim 29 wherein the stop position defining member is spring biased for sliding movement along the longitudinal axis of the follower arm.

31. A limited-use tape cartridge as in claim 30 wherein:

said housing includes a zig-zag track; and said stop position defining member includes a portion that is also confined to move along said track.

32. A limited-use tape cartridge as in claim 31 wherein said zig-zag track includes at least one abutment portion corresponding to a follower arm position wherein the longitudinal axis is past said centerline.

33. A limited-use tape cassette as in claim 28, further comprising a stop arm spring-biased between two over-center positions and wherein said follower arm is configured to move the stop arm from a first position during a rewind cycle after having played a portion of the tape.

34. A limited use tape cassette comprising:

a housing enclosing a tape spooled to pass from a rotatable supply reel to a rotatable take-up reel during tape play;

a first pivoted follower arm disposed to ride on spooled take-up reel tape and configured to limit use of the cartridge after a final period of tape play; and a second pivoted follower arm also disposed to ride on spooled take-up reel tape and configured to restrain said first follower arm from operation during an initial period of tape play.

35. A limited use tape cassette comprising:

a housing enclosing a tape spooled to pass from a rotatable supply reel to a rotatable take-up reel during tape play; and at least two controllably interlocked pivoted arms, at least one of which is a pivoted follower biased to ride on spooled take-up reel tape and at least one of which is configured to limit use of the cartridge after a predetermined relationship with the other pivoted arm is reached.

36. A limited-use tape cassette comprising:

a housing enclosing a tape spooled to pass from a rotatable supply reel to a rotatable take-up reel during tape play;

at least two follower arms each pivotally secured at a proximal end with respect to the housing;

at least one of said follower arms having a distal portion biased to abut spooled tape on the take-up reel;

at least one of said follower arms being configured to restrain the other during an initial period or number of times of tape play; and at least one of said follower arms being configured to thereafter prevent further rewind reel movement.

37. A limited-use tape cassette as in claim 36 wherein one of said follower arms is longer in length than another follower arm, a longer follower arm being configured to restrain a shorter arm during said initial period.

38. A limited-use tape cassette as in claim 37 wherein:

said longer follower arm includes a recess through which said shorter follower arm passes and is thereby restrained during an initial stage of tape play;

said longer follower arm also including a platform juxtaposed with respect to said recess; and said shorter follower arm being released from said recess to thereafter slidingly engage said platform during at least a portion of said initial stage of tape play.

39. A limited-use tape cassette as in claim 36 wherein:

one of said follower arms is coupled to simultaneously rotate a spring-biased ratchet arm toward teeth on the periphery of the take-up reel as tape play progresses in a final stage of tape play, and said ratchet arm and teeth cooperate to prevent further rewind of the tape after becoming engaged.

40. A limited-use tape cassette including a housing enclosing a tape spooled to pass between a rotatable supply reel and a rotatable take-up reel, the limited-use tape cassette further comprising:

a first follower arm biased to follow spooled tape on said take-up reel; and a second follower arm which is restrained directly or indirectly by the first follower arm during an initial period of tape play but which is thereafter released and biased toward said take-up reel to restrain rewinding of tape back onto the supply reel after predetermined unrestricted use of the tape cassette.

41. A limited-use tape cassette as in claim 40 wherein:

said second follower arm slides within a recess of the first follower arm during a portion of said initial period of tape play; and said second follower arm includes a projecting leg portion which thereafter slides along a platform of the first follower arm during a subsequent portion of said initial period of tape play.

42. A limited-use tape cassette as in claim 40 wherein said first and second follower arms are each pivoted about respective different axes, said first follower arm being longer in length than the second follower arm.

43. A limited-use tape cassette as in claim 40 wherein said second follower arm controls movement of a ratchet arm into engagement with peripheral teeth on the take-up reel to thereafter prevent rewind operations.

44. A limited-use tape cassette as in claim 43, further comprising:

a bias spring acting between the second follower arm and its associated ratchet arm to cause them to move in tandem until the ratchet arm engages the peripheral teeth after which further tape play causing further rotation of the second follower arm increasingly biases the ratchet arm into said engagement via the bias spring.

45. A method for limiting the use of a tape cassette, said method comprising:

following a radial dimension of spooled tape on a supply reel during its unwinding therefrom with a pivoted follower arm;

causing a longitudinal axis of the follower arm to pivot past a centerline defined between the rotational axis of the reel and the pivot axis of the arm after a predetermined amount of tape has been unwound from the reel during at least one predetermined tape play cycle of use; and stopping said follower arm at a predetermined point from further pivoting past the centerline and thus thereafter increasing reel rewinding torque after a predetermined amount of tape has been rewound onto said supply reel.

46. A method as in claim 45 wherein said at least one predetermined tape play cycle is the first tape play cycle of use.

47. A method as in claim 45 wherein said at least one predetermined tape play cycle is the second tape play cycle of use.

48. A method for limiting the use of a tape cassette, said method comprising:

(a) following a radial dimension of spooled tape on a take-up reel during tape play with a first follower arm;

(b) using movement of said first follower arm to release a second pivoted arm after an initial period of tape play; and (c) using movement of said second arm to prevent tape rewind during a final period of tape play.

49. A method for limiting the use of a tape cassette as in claim 48 wherein step (c) includes:

moving a ratchet arm in tandem with a follower arm towards engagement with peripheral teeth on the take-up reel; and spring-biasing said ratchet arm into engagement with said teeth during said final period of tape play.

50. A method for limiting use of a tape cassette, said method comprising:

biasing a first pivoted follower arm to ride on spooled take-up reel tape; and maintaining a second pivoted arm in direct or indirectly interference with said first arm during an initial period of tape play after which said interference is removed to limit use of the cartridge.

51. A method for limiting use of a tape cassette, said method comprising:

biasing a pivoted follower to ride on spooled take-up reel tape and temporarily interlock another pivoted arm during an initial unrestrained tape play usage of the cassette; and thereafter using motion of the pivoted follower to release the interlock and cause limited further use of said cassette.

52. A limited-use tape cassette comprising:

a housing enclosing a tape spooled to pass from a rotatable supply reel to a rotatable take-up reel during tape play;

a follower arm pivotally secured at a proximal end with respect to the housing;

said follower arm having a distal portion biased to abut spooled tape on one of the reels; and said follower arm being configured to controllably interfere with another rotatable arm and thereby cause limited further tape play after predetermined unrestricted tape play use of the tape cassette.

53. A limited-use tape cassette as in claim 52 wherein said another rotatable arm includes a projection which is captured by structure on the follower arm to traverse a predetermined path therealong as successive cassette use cycles occur.

54. A limited-use tape cassette as in claim 53 wherein said structure on the follower arm includes a zig-zag slot formed within the follower arm and said another arm includes a pin engaged within said slot during permitted cassette usage.

55. A limited-use tape cassette as in claim 54 wherein said slot includes a blind end at which said pin becomes trapped after a predetermined number of cassette use cycles.

56. A limited-use tape cassette as in claim 53 wherein said structure includes a series of wall projections carried by said follower arm and said another arm includes a pin engaged thereby during permitted cassette usage.

57. A limited-use tape cassette as in claim 56 wherein said wall projections are shaped to permit eventual rotation of a ratchet pawl carried by the another arm into engagement with teeth disposed about the periphery of one of said reels to thereafter permit only unidirectional rotation of that reel.

58. A limited-use tape cassette as in claim 52 wherein the follower arm comprises a laterally projecting lobe directed towards spooled tape on the other of said reels and dimensioned to provide static stability for the follower arm during shipping and handling of the tape cassette.

59. A limited-use tape cassette as in claim 58 wherein said follower arm comprises a curved exterior surface for contact with spooled tape on said one reel and is dimensioned not to contact spooled tape on the other of said reels.

60. A limited-use tape cassette as in claim 52 wherein said another rotatable arm includes a ratchet pawl biased to move toward peripheral teeth on one of said reels but restrained from engagement with such teeth by the follower arm until after a predetermined unrestricted tape play use of the tape cassette.

61. A limited-use tape cassette as in claim 52 wherein said follower arm has opposed follower and restraining lobes at its distal portion which never pass beyond a line drawn between rotational centers of said two reels.

62. A limited-use tape cassette as in claim 52 wherein said another arm carries successive indicia visible through said housing to indicate the number of remaining authorized cassette use cycles.

63. A limited-use tape cassette as in claim 52 wherein said another arm is enclosed within a bifurcated portion of said follower arm.

64. A limited-use tape cassette comprising:
 a housing enclosing a tape spooled to pass from a rotatable supply reel to a rotatable take-up reel during tape play;
 a first pivoted follower arm disposed to ride on spooled take-up reel tape and configured to limit use of the cartridge after a final period of tape play; and
 a second pivoted arm configured to interact with said first follower arm and to restrain further tape spooling movement after an initial period of tape play.

65. A limited-use tape cassette including a housing enclosing a tape spooled to pass between a rotatable supply reel and a rotatable take-up reel, the limited-use tape cassette further comprising:
 a first follower arm biased to follow spooled tape on said take-up reel; and
 a second arm which is caused by the first follower arm to move incrementally along a predefined track during an initial period of tape play and which thereafter restrains further cassette usage after predetermined unrestricted use of the tape cassette.

66. A method for limiting the use of a tape cassette, said method comprising:
 following a radial dimension of spooled tape on a tape cassette reel with a pivoted follower arm that reciprocates about a pivot axis as tape is wound onto and unwound from said reel;
 following the reciprocating follower arm movements with another pivoted arm controllably engaged therewith along a track during at least one predetermined tape play cycle of use; and
 using the another arm to restrain further tape play cycles of use as a function of its positional history along said track.

67. A method for limiting the use of a tape cassette, said method comprising:
 (a) following a radial dimension of spooled tape on a take-up reel during tape play with a follower arm;
 (b) using movement of said follower arm to control movement of a second pivoted arm after an initial period of tape play; and
 (c) using movement of said second arm to prevent further substantial tape usage after a predetermined number of tape play cycles.

68. A method for limiting the use of a tape cassette as in claim 67 wherein step (c) includes:
 moving a ratchet arm in tandem with a follower arm towards engagement with peripheral teeth on the take-up reel; and
 spring-biasing said ratchet arm into engagement with said teeth during a final period of tape play.

69. A method for limiting the use of a tape cassette as in claim 67 wherein step (c) includes:
 incrementally rotating said second arm along a radial dimension of said follower arm during successive tape use cycles; and
 locking the relative positions of said follower arm and said second arm at a predetermined relative position to thereafter restrain further follower arm movement and thus to also thereafter restrain further tape cassette usage.

70. A method for limiting use of a tape cassette, said method comprising:
 biasing a first pivoted follower arm to ride on spooled take-up reel tape; and
 maintaining a second pivoted arm in direct or indirectly interference with said first arm during an initial period of tape play after which said interference is removed or increased to limit use of the cartridge.

71. A method for limiting use of a tape cassette, said method comprising:
 biasing a pivoted follower to ride on spooled take-up reel tape and temporarily controllably engage another pivoted arm during an initial unrestrained tape play usage of the cassette; and
 thereafter using motion of the pivoted follower to cause limited further use of said cassette.

* * * * *